(12) United States Patent
Egnal et al.

(10) Patent No.: US 8,369,399 B2
(45) Date of Patent: Feb. 5, 2013

(54) SYSTEM AND METHOD TO COMBINE MULTIPLE VIDEO STREAMS

(75) Inventors: Geoffrey Egnal, Bethesda, MD (US);
Rodney Feldman, Herndon, VA (US);
Bobby Gintz, Knoxville, TN (US);
Kyungnam Kim, Herndon, VA (US);
Robert G. Palmer, Jr., Knoxville, TN
(US); Bennett Wilburn, Bejing (CN)

(73) Assignee: Sony Corporation, Tokyo (JP)

( * ) Notice: Subject to any disclaimer, the term of this patent is extended or adjusted under 35 U.S.C. 154(b) by 1759 days.

(21) Appl. No.: 11/674,561

(22) Filed: Feb. 13, 2007
(Under 37 CFR 1.47)

(65) Prior Publication Data
US 2008/0060034 A1    Mar. 6, 2008

Related U.S. Application Data

(60) Provisional application No. 60/772,670, filed on Feb. 13, 2006.

(51) Int. Cl.
*H04N 7/12* (2006.01)
(52) U.S. Cl. .................................. 375/240.08
(58) Field of Classification Search .................. 375/240, 375/240.08
See application file for complete search history.

(56) References Cited

U.S. PATENT DOCUMENTS

| | | | |
|---|---|---|---|
| 2,104,976 A | 1/1938 | Eliel | |
| 2,841,063 A | 7/1958 | Park | |
| 3,392,645 A | 7/1968 | Neasham | |
| 4,219,268 A | 8/1980 | Uchida | |
| 4,797,942 A | 1/1989 | Burt | |
| 5,130,794 A | 7/1992 | Ritchey | |
| 5,200,818 A | 4/1993 | Neta et al. | |
| 5,915,094 A | 6/1999 | Kouloheris et al. | |
| 6,834,083 B1 * | 12/2004 | Tahara et al. | 375/240.28 |
| 7,010,144 B1 * | 3/2006 | Davis et al. | 382/100 |
| 7,986,847 B2 * | 7/2011 | Kitajima | 382/236 |
| 2001/0019657 A1 * | 9/2001 | McGrath et al. | 386/46 |
| 2003/0103645 A1 * | 6/2003 | Levy et al. | 382/100 |

(Continued)

FOREIGN PATENT DOCUMENTS

| CN | 1496535 A | 5/2004 |
|---|---|---|
| JP | 2001-94857 | 4/2001 |

(Continued)

OTHER PUBLICATIONS

Office Action from Chinese Patent Office in counterpart Application No. 200780012676.0 mailed Jul. 30, 2010 (13 Pages) and translation thereof (16 pages).

(Continued)

*Primary Examiner* — Techane Gergiso
(74) *Attorney, Agent, or Firm* — Finnegan, Henderson, Farabow, Garrett & Dunner, L.L.P.

(57) ABSTRACT

Methods and systems for combining multiple video streams are provided. Video feeds are received from multiple optical sensors, and homography information and/or corner metadata is calculated for each frame from each video stream. This data is used to mosaic the separate frames into a single video frame. Local translation of each image may also be used to synchronize the video frames. The optical sensors can be provided by an airborne platform, such as a manned or unmanned surveillance vehicle. Image data can be requested from a ground operator, and transmitted from the airborne platform to the user in real time or at a later time. Various data arrangements may be used by an aggregation system to serialize and/or multiplex image data received from multiple sensor modules. Fixed-size record arrangement and variable-size record arrangement systems are provided.

35 Claims, 11 Drawing Sheets

U.S. PATENT DOCUMENTS

| | | | |
|---|---|---|---|
| 2003/0160871 A1 | 8/2003 | Pelletier et al. | |
| 2004/0076340 A1 | 4/2004 | Nielsen | |
| 2004/0086265 A1* | 5/2004 | Tojo et al. | 386/69 |
| 2004/0167709 A1 | 8/2004 | Smitherman et al. | |
| 2004/0170330 A1 | 9/2004 | Fogg | |
| 2004/0228413 A1* | 11/2004 | Hannuksela | 375/240.25 |
| 2005/0068632 A1 | 3/2005 | Holloway et al. | |
| 2005/0271251 A1* | 12/2005 | Russell et al. | 382/103 |
| 2006/0067362 A1* | 3/2006 | Ramakrishnan | 370/468 |
| 2007/0061393 A1* | 3/2007 | Moore | 709/201 |
| 2009/0046155 A1* | 2/2009 | Jacumet | 348/207.1 |

FOREIGN PATENT DOCUMENTS

| | | |
|---|---|---|
| JP | 2002-500989 | 1/2002 |
| JP | 2003-23553 | 1/2003 |
| JP | 2004-186922 | 7/2004 |
| JP | 2005-64906 | 3/2005 |
| JP | 2005-80015 | 3/2005 |
| JP | 2005-283756 | 10/2005 |
| JP | 2005-538394 | 12/2005 |
| JP | 2006-25340 | 1/2006 |
| WO | WO 98/47291 | 10/1998 |
| WO | WO 00/10129 A1 | 2/2000 |
| WO | WO 02/06892 | 1/2002 |
| WO | WO 03/021187 | 3/2003 |

OTHER PUBLICATIONS

Japanese Office Action mailed Feb. 7, 2012, from the Japanese Patent Office for Japanese Patent Application No. 2008-554546 (3 pages).

European Patent Office Communication dated Feb. 23, 2012 for European Patent Application No. 07 756 929.1 (8 pages).

* cited by examiner

SYSTEM AND METHOD TO COMBINE MULTIPLE VIDEO STREAMS

RELATED APPLICATIONS

This application claims priority to U.S. Provisional Application No. 60/772,670 filed Feb. 13, 2006, the disclosure of which is incorporated by reference in its entirety. This application is related to U.S. application Ser. No. 11/456,745, filed Jul. 11, 2006, the disclosure of which is incorporated herein by reference in its entirety.

GOVERNMENT RIGHTS

This invention was made with U.S. Government support under contract No. NBCHC050090 awarded by the U.S. Department of the Interior—National Business Center, on behalf of the Department of Defense Agency—Defense Advanced Research Projects Agency. The government has certain rights in this invention.

BACKGROUND

Various sensor and observational systems are known. For example, various type of aircraft are used to service ground units in the filed, providing them with real time data relevant to their mission objectives. If there are high resolution requirements, the aerial platform may conventionally fly low to the ground. Since flying at low altitude may be more dangerous, unmanned aerial vehicles (UAVs) rather than manned aircraft are often used. Some UAVs may be launched from the field, and this portability requirement may force the platform to be small and lightweight. This results in smaller payloads, limiting the complexity of onboard sensors. Example tactical UAVs include the Pioneer and the ScanEagle. Smaller UAVs have been developed, such as the Dragon Eye and others. These aircraft may fly below 10K feet and may have a payload under 100 lbs.

As sensor systems increase in capacity, there is a need to manage large amounts of image data, such as multiple video streams. Specifically, there is a need to be able to identify and/or track objects present in video streams, while correcting for movement of the observation platform. While techniques exist for manipulating and visualizing image data received from a remote and/or aerial sensor system, currently availability techniques generally do not have sufficient processing power and/or bandwidth to perform complex image manipulation and transformation.

DETAILED DESCRIPTION

Figure 1:
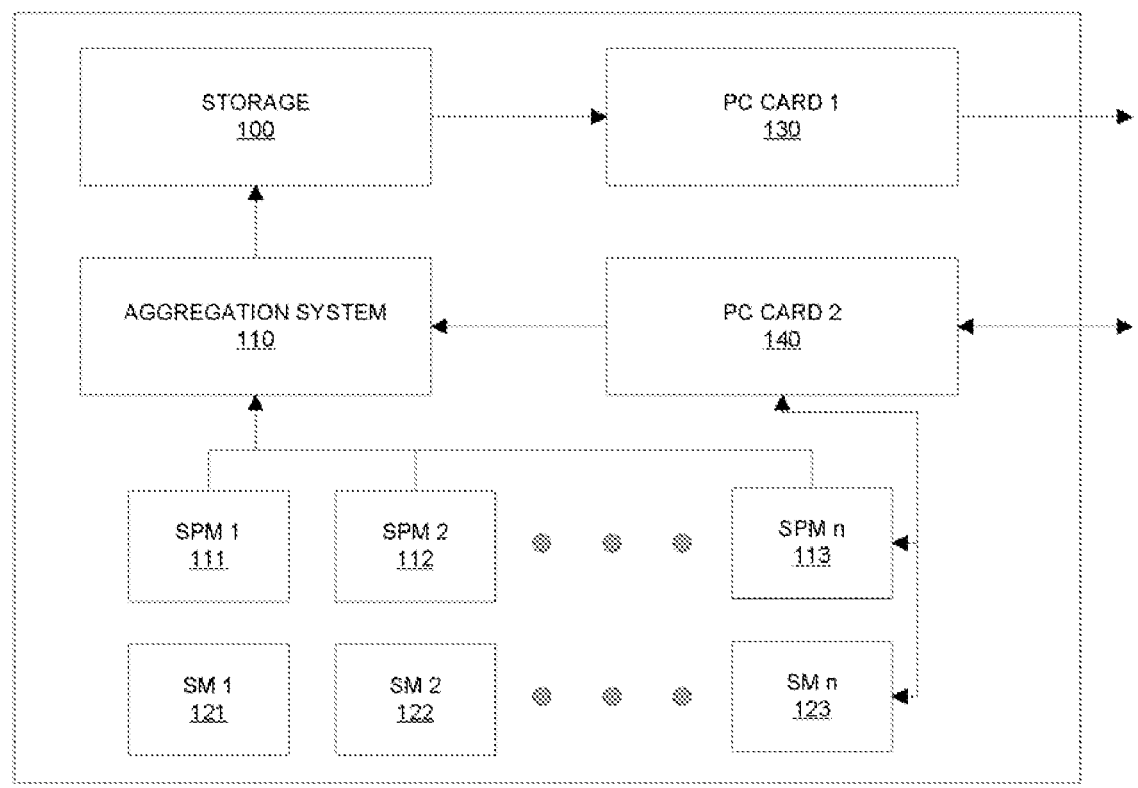
FIG. 1 shows an exemplary system for processing image data according to an embodiment of the invention.

Methods and systems for combining multiple video streams are provided. In an embodiment, video feeds are received from multiple optical sensors, such as a camera array. The image data for each frame of the video feeds is used to combine the video streams into a composite video. To create the composite video, homography information and/or corner metadata is calculated for each frame from each video stream. This data is used to mosaic the separate frames into a single video frame. Local translation of each image may also be used to synchronize the video frames. Sensor movement may be accounted for by indentifying a feature that occurs in successive video frames and suing the predicted movement of the feature to compensate for extraneous motion. In an embodiment, the optical sensors are provided by a mobile platform, which may be airborne, such as a manned or unmanned surveillance vehicle. Image data can be requested from a ground operator, and transmitted from the airborne platform to the user in real time or at a later time. In an embodiment, a composite image and/or video can be created dynamically, which may account for camera movement.

Various data arrangements may be used by an aggregation system to serialize and/or multiplex image data received from the sensor modules. Exemplary methods include fixed-size record arrangement and variable-size record arrangement. In a fixed-size record arrangement, each recording block may be a multiple of a physically-relevant size.

A graphical user interface is provided to allow a user to request, view, and manipulate image data, including data from or contained in a gigapixel image. The user interface may communicate with various other systems, such as image capture and storage systems, by sending requests for image data requested by a user. Various overlays, icons, and other information may be presented in conjunction with image data received from the other systems to provide additional data to the user, such as activity level and object movement.

Embodiments of the present invention comprise an array of optical sensors and lenses that are operable to capture a wide angle image, such as a wide angle video image. As used herein, terms such as "camera" and the like, even when used in the singular, shall be read to include a plurality of image capture devices such as a plurality of optical sensors (e.g., where output from a plurality of sensors is aggregated to effectively form a single image). While the term "gigapixel" is used throughout the text to describe image data, it will be appreciated that a multi-sensor cameral may be made or used having any suitable resolution (e.g., terapixel, etc.), and corresponding image an/or video resolution.

Embodiments further include methods and systems operable to process images captured by an array of optical sensors and present the images to users in an interactive fashion. Further embodiments include a user interface operable to permit user interaction with a system that includes an array of sensors. For instance, one example of a user interface embodiment may provide users the ability to select a portion of a large image to view in greater detail, e.g., as a "virtual pan-tilt-zoom (PTZ) camera." Additional embodiments include a system for mounting an array of optical sensors, a method of calibrating a system that includes an array of optical sensors, and several methods of using a system that includes an array of optical sensors.

Some embodiments comprise a flying platform, a wide-angle camera system secured to the flying platform, and a real-time viewing station remote from the flying platform that is operable to provide views from the wide-angle camera system.

Other embodiments comprise a data workflow/algorithm operable to process image data, comprising any number of corner/feature detection; image tile mosaicking; image motion estimation (registration); intracamera pre-processing; PTZ view extraction; and/or target tracking and interference.

Other embodiments comprise image data multiplexing and/or a dedicated file indexing system/method.

Other embodiments comprise a graphical user interface (GUI) operable to render images and receive user input relating to such images.

Other embodiments comprise a dome-like frame structure configured to hold a plurality of image sensors and optics operable to collectively capture wide-angle images.

Each of these embodiments will be described in greater detail below, in addition to several other embodiments.

Embodiments of the present invention provide for creation of a "gigapixel" image or video frame. As used herein, a "gigapixel" image is one having approximately $10^9$ pixels, though images having from $8 \times 10^8$ to $1.2 \times 10^9$ pixels are also considered to be "gigapixel" images. A gigapixel video is a motion picture video stream composed of gigapixel images. As used herein, "image data" may refer to data that can be used to construct an individual image, a video frame, or a video sequence. Gigapixel images and video may be useful for imaging large areas, for example, in aerial observation systems. Since no currently-available single camera system provides such a large amount of image data, a gigapixel image may be created by combining image data from multiple optical sensors.

Video feeds may be received from multiple sensors, such as a camera array. In an embodiment it may be preferred for the sensors to be mobile, and specifically to be available on a mobile, airborne platform. Exemplary sensor systems may target altitudes of 25,000 feet and below. Of course, any other altitude levels may be used, and the methods and systems described herein may also be used with ground-based sensor systems or other optical image capture systems. An exemplary multi-lens array is described in U.S. application Ser. No. 11/456,745. The image data for each frame of the video feeds can be combined into a composite video. To create the composite video, homography information and/or corner metadata can be calculated for each frame from each video stream. As used herein, "homography information" refers to image transformation information. For example, when a motion estimation is calculated for a video stream, the homography information describes the transformation associated with a motion estimation between two frames in the same sequence, such as frames taken at t=1 and t=2. This image transformation information can be used to mosaic the separate frames into a single video frame. Local translation of each image may also be used to synchronize the video frames. Sensor movement may be accounted for by identifying a feature that occurs in successive video frames and using the predicted movement of the feature to compensate for extraneous motion.

Motion estimation and tracking, such as tracking a displayed feature, can be performed using a combined video stream. The system may use various methods and algorithms to identify a moving feature displayed in the video stream and predict and/or track its movement through the area displayed in the video stream.

Video streams may be multiplexed, such as with a TDM or TDMA arrangement for real-time or delayed display and/or storage of video streams. Such an arrangement may reduce processing and/or storage recording time.

A graphical user interface may allow user control over the combination and aggregation of video streams. The interface can display a full image, or is may display only a portion of the image as requested by the user. If the user requests only a portion of an available image, the user interface may instruct a computer control system to only capture image data from the requested area, thus reducing processing time and bandwidth. The user interface also may communicate with a motion estimation and tracking system, to allow for icons and other overlays to be displayed on the video stream, where the overlaid elements correspond to features displayed in the video stream.

Combining Multiple Video Streams

FIG. 1 shows an exemplary high level system for processing image data according to an embodiment of the invention. Multiple Sensor Modules (SMs) 121, 122, 123 and associated Sensor Processing Modules (SPMs) 111, 112, 113 may capture image "tiles" and provide processing functions that can be used to generate a coherent composite view. In tandem with a controller PC (PC Card 2 140), these Sensor Processing Modules may produce aligned tiles for storage and/or live viewing, with compressed video output. The compressed video may be transmitted from each tile to an aggregation system 110, which serializes the data streams, enabling input to a storage device 100. The aggregation system may multiplex variable bit-length video data and associated metadata to allow for high speed data storage. For example, aggregation may be performed at the hardware level using deterministic timing information received from multiple cameras. The system of this example may account for the variable length of the data by reading packet header information to determine when the video data ends and when the metadata ends. A custom file indexing system may store and index metadata and image data. An exemplary storage device for storing captured and/or aggregated video is a VMetro storage system.

In an embodiment, the SMs 111 . . . 113 and SPMs 121 . . . 123 may operate in parallel. That is, at each point in time $t_0$, $t_1$ each sensor may capture an image to be processed by an associated processing module. Each processing module can calculate metadata for the image received from a sensor, such as metadata identifying features in the image ("corner" metadata), identifying or describing relative motion of the sensor ("movement estimation" metadata), or other metadata. Each processing module can also perform compression on the image data. Since each image obtained from an individual sensor can be considered independently from image images obtained from any other sensors in the system, each processing module can operate independently from the other processing modules. Data and metadata from the sensor processing modules may later be combined to form a composite image.

For visualization, PC Card 1 130 can request views from the storage device, decompress them, extract a view, and recompress the resulting VGA feed (video chip out). This may reduce communication bandwidth needed to display a view. For example, when a ground-based user requests image data from an aerial camera system, the user may specify a desired view. The PC Card 130 can then determine the relevant image data stored in the storage device, extract the requested view, and recompress the image data before sending it to the user. Such a process can decrease the bandwidth required to transmit the image data, since only the data relevant to the requested view is compressed and transmitted. This architecture can also allow for a retrace scenario by enabling storage of arbitrary duration and by enabling a scalable structure for smaller or larger resolutions. For example, if a user indicates that he wants to view a video stream for a desired region over a desired time duration, the system can extract, process, and transmit only the image data relevant for the requested region and time.

To support live views from a gigapixel image, additional processing may be used. In this case, PC Card 1 130 may be replaced by custom hardware. The design shown in FIG. 1 may use a low speed data link, but may also take advantage of higher bandwidth links for additional views or greater resolution or field of view. Pan-tilt-zoom (PTZ) views may be "chipped out" using PC Card 1. Such views may be created dynamically, allowing an operator of the system to request a sub-window view that is mosaicked on-demand.

Physically, aggregation circuit boards, PC cards, storage controllers, and Sensor Processing Modules can be located in a VME (VersaModule Eurocard) card cage. A VME card cage can provide a rugged solution for circuitry, and such cages are often used in military, aeronautics, and space applications. Of course, this configuration and these components are merely exemplary, and any other components and configurations may be used.

A control computer on PC Card 2 140 can receive ground control signals for the system, such as over a wireless connection, and send appropriate control information to the Sensor Processing Modules. The control computer may also coordinate image pre-processing and/or image processing, alone or in conjunction with a virtualization system. For example, the control computer may receive homography information from the Sensor Processing Modules, receive corner information from the Sensor Modules, and send motion estimates and mosaic estimates to a visualization subsystem (for example, on PC Card 1). Data may be passed to, from, or through an aggregation system.

When a wireless connection is used, the wireless connection interface may be through a standard RS232 interface, or a higher bandwidth connection. Internal connections such as the sensor modules may be through a gigabit Ethernet or other communication medium.

The processor also may integrate individual motion estimates (homographies) received from multiple optical sensors, such as an array of tile cameras, and generating the appropriate information for the visualization system to fixate on a desired view. As further described below, the images may be de-jittered and mosaicked into a single image using corner information. These functions may be employed at the visualization system, so data may be passed to the visualization system for immediate use and to the storage system to reduce reprocessing on the ground. In addition, the control PC may originate the frame synchronization signal for each Sensor Module.

While the illustrated example includes two PC cards, it will be appreciated that any number of PC cards may be used. By way of example only, a single PC Card may be used. In addition, any alternative to a PC Card may be used.

A gigapixel image can be obtained from an array of multiple sensors. Exemplary sensors include CMOS sensors and CCD cameras or sensors. A specific example of a sensor is the LUPA line of image sensors available from Cypress Semiconductor corporation, San Jose, Calif. Each sensor can be mounted on an individual Sensor Module. Each Sensor Module may be mechanically mounted on an optical assembly, because light may be focused onto the sensor. To reduce the physical size and weight of the optical assembly, the board area of each Sensor Module may be not much larger than the sensor itself. Therefore, each Sensor Module may include the minimal amount of circuitry required to control the sensor and collect light. Sensor Module circuitry can include one sensor, power supplies for the any analog portions of the sensor, a FPGA (field programmable gate array) for sensor control and data transmission, and a connector for cabling and communication with other elements of the system. Data collected by each Sensor Module can be transmitted to a corresponding Sensor Processing Module.

Although exemplary embodiment are described with respect to a "gigapixel" system, it will be understood that the present invention may be scaled to any desired resolution. Since the sensor modules and sensor processing modules can operate in parallel, and the aggregation system 110 can serialize and manipulate an arbitrary number of video streams, an arbitrary number of sensors and sensor processing modules may be used. For example, any number of sensor modules 121, 122, 123 and sensor processing modules 111, 112, 114 may be used. As a specific example, a system capable of providing a composite image having $10^{12}$ pixels (a "tetrapixel" system) may be achieved.

A Sensor Processing Module of the present example can accept image data from its corresponding Sensor Module and processes it. Operations may include normalizing the image, computing the corners in the image, calculating the image motion from frame to frame, and compressing the image. Circuitry on the Sensor Processing Module can include an FPGA, one or multiple DPSs, memory for image buffering and algorithm work space, local power supplies, and connectors to support data and control input and output.

Figure 2:
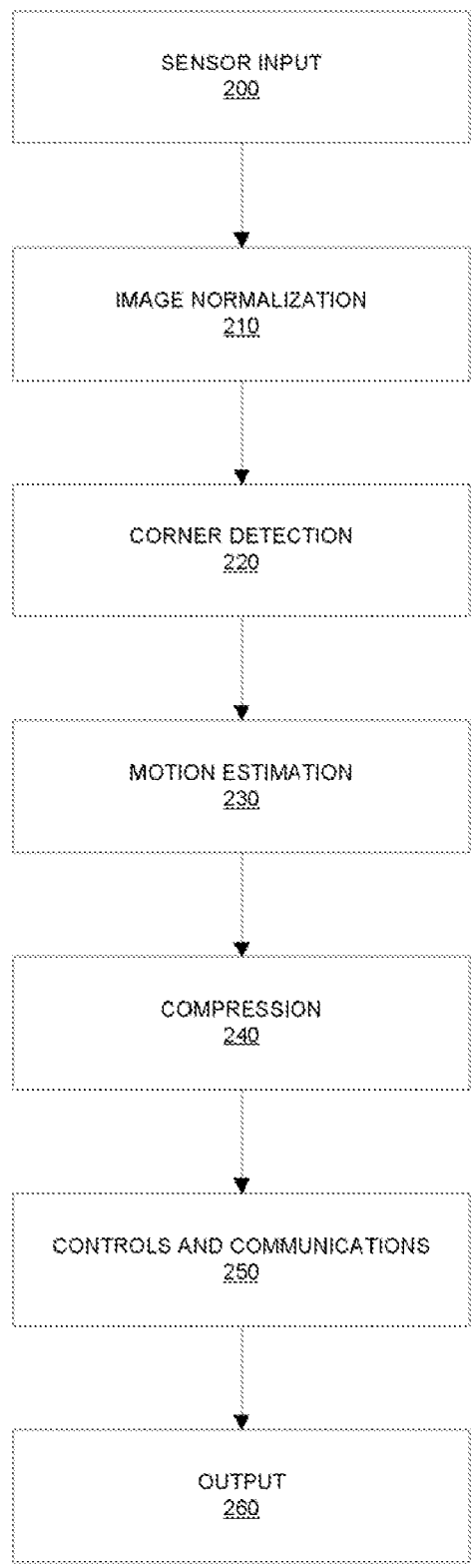
FIG. 2 shows a flow diagram for a sensor processing module according to an embodiment of the invention.

A flow diagram for a Sensor Processing Module algorithm is shown in FIG. 2. The image data flow may begin with capture of raw pixels by a the sensor 200. For example, Sensor Modules as previously described may capture raw image data. The data can be sent to a Sensor Processing Module for image normalization 210. Normalization can correct, for example, dead pixels, pattern noise, brightness, and contrast. Predetermined calibration parameters also may be applied to ensure that multiple tiles appear uniform.

After the image is normalized, the corners can be identified for the image 220, and a motion estimate can be generated 230. This may occur on the same processor as normalization, such as a FPGA, or a second processor such as a DSP chip may be used for this purpose.

The image tiles can be compressed 240 and transmitted for storage and subsequent visualization. An exemplary system uses a compression system from ATEME to compress each tile image, using one 1 Ghz DSP from Texas Instruments. Synchronized compression of multiple processed tiles may be used to improve storage efficiency. Since the sensors can be synchronized, and the timing of the various processors may be the same, such synchronization should be achievable using available components.

Compressed images may be transmitted to an aggregation system to build a combined data stream that can enter the storage module 250. Image, homography, and corner data can be transmitted over a high speed interface 260, such as LVDS or gigabit Ethernet. Exemplary output from the system may include compressed video, instantaneous motion, homography and corner data.

Additional control of the Sensor Processing Module (and its associated Sensor Module) may be performed by a control interface. In an embodiment, system reboot and sensor parameters, such as frame rate and/or exposure time, may be handled by a control interface 250. As a specific example, a web server, controlled via Ethernet, may allow for a control interface and system debugging features.

In an embodiment, to capture a coherent gigapixel image across all sensors, each sensor in the array initiates capture simultaneously. A frame synchronization signal, which may be generated in real time, can be used to provide such triggering capability. It may be transmitted over a dedicated wire from a control computer to interface with a sensor controller in the Sensor Module and Sensor Processing Module FPGAs.

The Sensor Processing Modules can transmit their video data to an aggregation system prior to storage. The aggregation system can combine the image data into multiple serialized data streams for transmission to the storage system. Additionally, the aggregation system can save the image motion and corner estimates with the video so that a ground station does not have to re-compute this data.

To create a composite image, the system may assume that all images received from the optical sensors are globally aligned with respect to each other so that adjacent borders match. However, additional processing may be required to create the composite image from a set of individual images (tiles). The process of mosaicking a set of tiles can include various functions. A normalization process may be used to correct variations in sensor sensitivity resulting in brightness/intensity differences across the matrix. Variations in the image planarity and projection due to differences in the optic angle, sensor physical registration etc. may be eliminated through dewarping. To eliminate absolute and relative motion between sensors due to vibration and non-rigidity of the sensor plane may be eliminated, the images may, be de-jittered. Redundant pixels may be eliminated by cropping the edges of one or more of the tiles.

The system may utilize dewarp and normalization transforms that are unique for each optical/sensor plane but static over time. Hence, tile transforms can be pre-determined and programmed into the camera via a ground calibration process. These functions can be performed at the Sensor Processing Modules.

The other functions may be dynamic and may need to be computed in real time at the camera's operating frame rate. As an example, PC Card 1 may perform these functions based on data from a controlling PC, such as PC Card 2.

to reduce the weight, cost, and complexity associated with wiring the system described with respect to FIG. 1, serial interfaces may be used for long distance (greater than an inch or so) transmission. LVDS variants (both unidirectional and bidirectional) and Ethernet can also be used. Power over Ethernet or similar systems may reduce wiring by combining power and communications into one connection. Embodiments also may include an extra high speed connection on the Sensor Processing Module for other purposes (e.g., should raw data be desired).

The system may process image data in multiple ways. Each process will now be described with reference to exemplary hardware that can be used for camera-side implementation. It will be understood that the processes described herein may be performed by a variety of other hardware and/or software, which may be commercially obtained or custom-created for an embodiment.

Mosaicking: The system may put image tiles from a single time instant into alignment so that the video stream does not appear to have jittering tiles. This may be different from standard "mosaicking" techniques that combine individual frames to produce a larger composite image. Generally, it will not be necessary to generate a stitched collection of gigapixel images. A difference between mosaicking as used herein and other motion detection techniques is that mosaicking occurs between images captured by multiple sensors at a single time instant, as opposed to global image motion and normal mosaicking which are performed with reference to or between two time periods, generally for images captured by a single sensor. Three stages of image processing may be used for mosaicking: corner detection on each tile, local translation between each tile, and a global estimate of how to create the overall gigapixel frame.

Corner Detection: To reduce the amount of pixel level computation and pixel communication on the bus, a corner-based method may be employed to determine the optical tiling adjustment. The corners can be calculated for each tile independently. Harris corners as described below may be used, though in some configurations, other methods may be used. In general, more precise corner detection requires more processing power and/or time. In some cases, such as an urban scene, even simple corner detectors may perform adequately. In an embodiment, a MIC (minimum intensity change) approach as described below and in further detail in M. Trajkovic, "Fast corner detection," *Journal of Image and Vision Computing*, vol. 16, pp. 57-87 (1998) is used. The approach includes a pyramid, where corners are detected in decimated images, and then followed down the pyramid. An edge detection algorithm also may be used to detect corners. Although the phrase "corner detection" is used herein, it will be understood that, more generally, such methods may be called "feature detection." That is, a "corner detector" as described herein also may be used to identify an arbitrary shape or feature within an image, video frame, video sequence, or other set of image data.

A corner detector may find a set of features which can be used in the subsequent algorithms such as image tile mosaicking and motion estimation. A large set of individual image tiles may be integrated into a global gigapixel image. For example, 271 4-megapixel sensors may be used. Since the image size may require more processing than is generally available in real-time processing, feature points obtained on an image, along with small image sub-windows (e.g., 11×11 pixels) around those points, may be used as input to the subsequent algorithms.

To address the prospect of shaking the system of the present example can put the image tiles at a single time instant into alignment so that the video stream does not appear to have jittering tiles.

Numerous image pre-processing tasks may be performed before images are delivered to subsequent modules, such as brightness correction, contrast enhancement, FPN removal, gamma correction, dead pixel detection and interpolation, white clip, and other tasks.

Exemplary corner detection methods may utilize Harris corner detection or a modified Harris method, SUSAN, MIC, COP, SIFT, and/or other detection methods. Exemplary detection methods are described in further detail below. These methods may select features other than corners, such as an image location that has gradients in all directions at a specific scale.

Harris corner detection uses a local gradient estimate $I_x$, $I_y$ and defines corners as points where the local autocorrelation of the image intensity is high. The measure of autocorrelation can be estimated from the first order derivatives. For each pixel location, a 2×2 autocorrelation matrix $A = g * [(\Box I)(\Box I)^T]$ is calculated, where g is a Gaussian smoothing mask. If both eigenvalues of A are large, the pixel is flagged as a corner. The eigenvalues are proportional to the principal curvatures of the local correlation function. Harris detection may work reliably for L junctions, but may be less efficient for other corner detection. For example, it may require several convolution for first derivatives and Gaussian smoothing. A modified Harris algorithm may be used which attains almost the same performance as the original algorithm, but has a much lower computational cost. Such an algorithm may select a pixel with a high image gradient as a corner candidate. For each pixel the image gradient is computed first, and if it is lower than some threshold, it is not necessary to evaluate the computationally expensive corner response function.

SUSAN (Smallest Univalue Segment Assimilating Nucleus) utilizes simple masking operations instead of a gradient convolution. For an arbitrary pixel in an image and a corresponding circular window surrounding it (where the center pixel is the center of the window), provided the image is not textured, there is a compact region within the window whose pixels have similar brightness to the nucleus. This area is selected as the SUSAN. The area and the center of gravity of the SUSAN are computed, and a corner detector based on these parameters along with non-maxima suppression may be used.

MIC (Minimum Intensity Change) is based on the variation of image intensity along arbitrary lines passing a the point of investigation within a neighborhood of the selected point. A corner is detected if the variation of image intensity along such lines is high for all line orientations, i.e., if the minimum intensity change is higher than the threshold. MIC employs linear interpolation to compute the directional first order derivatives. Unlike SUSAN, MIC makes no assumption about image structures in the vicinity of corners and it can detect a broader range of junctions. Since MIC offers an analytic solution for the minimum intensity change through interpixel approximation, it is considered to be relatively simple and fast.

COP (Crosses as Oriented Pair) uses the same concept as SUSAN, but calculates an inverted SUSAN area using cross-oriented operations, to obtain probabilistic dominant directions, classify corner candidates, test corners, and find local maxima in a search window.

A SIFT (Scale Invariant Feature Transform) method may be used with gradient, orientation, and scale. These features are invariant to image scale and rotation, and have been found to provide robust matching across a substantial range of affine distortion, change in 3D viewpoint, addition of noise, and change in illumination. SIFT can detects keypoints along with their scale and orientation. In "scale-space extrema detection," SIFT searches over all scales and image locations by using a difference-of-Gaussian function to identify potential interest points that are invariant to scale and orientation. In "keypoint orientation," at each candidate location, a detailed model is fit to determine location and scale. Keypoints can be selected based on measures of their stability. In "orientation assignment," one or more orientations are assigned to each keypoint location based on local image gradient directions. All future operations are performed on image data that has been transformed relative to the assigned orientation, scale, and location for each feature, thereby providing invariance to these transformations. In "keypoint description," the local image gradients are measured at the selected scale in the region around each keypoint. These local image gradients are then transformed into a representation that allows for significant levels of local shape distortion and change in illumination.

KLT ((Kanade-Lucas-Tomasi) and Shi-Tomasi detectors may be used. As with the Harris detector, these methods are based on computing eigenvectors of a scatter matrix of partial derivatives. KLT addresses change between image pair, which is important for tracking corners across time. The Shi-Tomasi detector may satisfy all the axioms of a corner detector. Other corner detection methods may be used, such as Gabot filtering, local extrema of wavelet transform, and other methods.

Local Translation: After the corners have been found, the motion between each tile may be calculated. To compensate for sensor jitter, a simplified model that assumes the only variability is translation can be used. Other causes of image motion, such as mounting inaccuracies and lens curvature, may not be translational. A model including such image motion is fully homographic, but these sources can be calibrated or compensated for prior to image capture. An exemplary method for calculating pairwise translation between each adjacent sensor is a random sample consensus (RANSAC) method. Using all of the corners in an overlap region, a best 1-D translation variable is fit.

Global Adjustment: After this individual motion has been found, a global estimation method may be performed to account for cases where each individual estimate is different—that is, the estimate for each sensor may not agree with the surrounding estimates. For example, if a sensor moves up 10 pixels relative to the sensor below it on the array, but the sensor below it has also moved up 10 pixels relative to the sensor below it on the array, images captured from the two sensors will appear to be correctly placed when compared to each other or in localized regions overlapping the images. However, the image tiles may still be mis-aligned with respect to other image tiles. In this case, a global adjustment may be made to make sure that all tiles are mosaicked appropriately. An exemplary method for performing global adjustment is a global least-squares process.

Risk Mitigation: It may be possible to select a specific mosaicking approach for a given application. For example, for a determination as to how much a specific optical design might shake, one may examine whether corners will be sufficient to register the images with the amount of overlap that designed in a given system. One might either have to reduce thresholds to get more corners, increase the overlap, switch to a correlation scheme, or take other measures An exemplary mosaicking method is to first measure pairwise translations for every image tile pair and then to fix one tile and align the others based on those pairwise translation measures. Another exemplary method is to use the pairwise translations for each image tile by fixing the tile and aligning the neighboring tiles, then iterating this process across all tiles. For example, tile 1 may be fixed, and tiles 2 . . . N aligned to tile 1; then tile 2 is fixed and tiles 1, 3 . . . N are aligned to tile 2, and so on, with the alignment being performed for each of the N tiles. This may be useful because tile positions can depend on the first fixed tile due to errors accumulated when aligning tiles one by one. The same pairwise translation results may be applied for each tile, and an average tile position can be obtained from the estimated positions. Correlation matching on overlapped regions may provide speed benefits compared to corner matching performed on the same overlapping regions.

The mosaicking method has been simulated, for example, by shaking or otherwise randomly perturbing a tile window from an original position where it is assumed the tile window was initially placed.

Intracamera Processing: The system also may perform back-end tasks. For example, after an image has been captured, it may be put into the correct mosaic location for a gigapixel image. This may involve a preliminary dewarp to reduce or remove sensor mounting aberrations and lens distortion. In a simple case these parameters are pre-calibrated, such as before an observational flight, and the algorithm may simply have to shift the pixels. In addition, the image may be processed in several other ways. For example, the images may be truncated and/or warped for mosaicking. After the image has been placed on the final image mosaic, the sensor output may be shifted and truncated to adjust for that placement. For example, if the tile moved up and over 3 pixels relative to the global mosaic, then the tile may be shifted downwards. The truncation may eliminate not only the portion of the image that extends over the tile after translation, but also any overlap between that tile and other tiles.

As another example, the images may be corrected for brightness/intensity variation. The overall mosaic may appear strange to a user if each tile has its own brightness and intensity variation. Additionally, a motion analysis, should it require pixel comparison, might fail in such conditions. Much of this correction can be established when a camera is manufactured or calibrated since the differences may be largely based on the individualized sensor response. Intensity levels may be adjusted using preset correction parameters so that the overall image appears seamless.

The images may also be enhanced, such as with contrast enhancement. An exemplary sensor may produce images of up to 10 bits per pixel, but of that, it is possible that only about 8 may survive compression. Given that the atmosphere may reduce contract, an equalization scheme may increase contract among the surviving bits.

Other image processing methods include fixed-pattern noise removal, dead pixel detection and interpolation, exposure controls, gamma correction, vignetting correction, and correction for other sources of radial intensity falloff.

Registration (Image Motion Estimation): Captured images may be registered. Because the search-range of many commercially-available MPEG encoders is built for smaller image sizes, the search range may be small compared to a gigapixel image or a tile to be used in a gigapixel image. Given the large image motion that may occur in the present invention, COTS MPEG chips may be unable to perform an efficient search, or in some cases to complete a search at all. To help the compression, MPEG chips may be encoded with an estimated motion. As another example, software available from Ateme may able to handle the 600 pixel motion of the present example at an exemplary SFPS. Further improvements may help quality or help use smaller and/or cheaper chips. It will also be appreciated that pixel motion of various ranges other than 600 pixels may occur.

Motion estimation may be used when a real time video stream is provided to a user. As a specific example, an observer on the ground who wants to look over a hill may request a video stream at a particular location from an airborne observation system. In such a scenario, it may be desirable for the requested location to remain fixed in the captured image data. In this case the system may not have to warp the entire imagery. Since only the PTZ window that is passed to the unit may be changing, a multi-sensor camera may only change the video window that is broadcast at each frame. The PTZ window then may be identified in response to the global motion estimation parameters. That is, the system may extract a sub-window and perform mosaicking on demand. For example, the sub-window can be based on a PTZ request received from an operator of the system. In an embodiment, dynamic mosaicking may be performed by calculating motion estimation metadata to determine movement of the sensors or each sensor and adjust the PTZ window accordingly.

Homography between multiple images can be calculated using RANSAC motion estimation. If analysis of test data reveals that the image motion is small enough that the motion estimation can be performed at the tile level, rather than at a global level (i.e., across all tiles), communication between tiles may be reduced. In an embodiment, a video frame or sequence selected for processing is representative of the entire video stream may be selected to improve the validity of such a test. With too few corners in the image data, or, for example, a flight pattern that is not representative of an actual target platform, the test may not be completely valid. For example, the camera view may be so wide that there will be an unrealistically large number of corners, allowing for good registration with respect to the test data, but that is not representative of registration that can be expected for the entire set of image data. Larger images may contain more features that can be used to perform motion estimation, allowing for the possibility of using local motion estimation instead of global motion estimation.

Before an image is delivered, such as to a ground unit, a "chip out" window may be extracted. Since the window can be of variable zoom, it may overlap multiple sensor tiles. After choosing which sensors are affected, the composite image can be downsampled as necessary and selected sensor images stitched together. Standard downsampling, such as applying a Gaussian filter before 50% reduction in each dimension, may be employed. The stitching process can be simplified if the images have been previously "de-jittered," or placed in their correct mosaic position.

The decision of whether to perform mosaicking can be complicated in some cases, because zoomed-out windows may not require any correction for sensor tile jitter, whereas higher zoom levels may require increased correction. However, other processes (e.g., global estimation) may need the mosaic, and so in some cases the mosaicking system may operate at all times.

An exemplary motion estimation may be performed where a user on the ground requests imaging from an airborne sensor system. The ground user may request a video stream of a small location. Due to bandwidth limitations, the system may only be able to transmit a relatively small zoom window around the requested location. However, the ground user may not want the video stream to move due to the airborne sensor movement. Motion compensation therefore may be performed in the air, since the video stream may not provide sufficient data to register sequential images if the video motion is too large. Such effects may be more pronounced for zoomed-in views. In such a situation, the system may use motion estimation and compensation to track how the image moves relative to the sensor system. Image warping, mosaicking, change detection, and similar transforms are generally not necessary at the sensor system. Instead the PTZ window can move to the new location—since the PTZ window sent to the ground user can change over time, the camera may only change the video window that is broadcast at each frame. Thus, the PTZ window may be set in response to global motion estimation parameters.

When MPEG compression is used, global motion estimation may also register imagery to provide a starting search range to an MPEG processor. This may avoid situations where sensor motion results in image motion which exceeds a compression chip's built-in search range, which can cause such chips to revert to a different compression scheme. For example, some MPEG encoders may revert to JPEG compression when a maximum search range is exceeded.

Compression Options: A gigapixel video camera according to the present invention can generate 5 GB/s of pixel data, or 18 TB/hr, assuming 1 byte per pixel and 5 frames per second. To record many hours of video at these rates without requiring undesirable amounts of storage, data compression may be employed. Selecting a specific video compression technique can involve tradeoffs between the compression ratio (which affects the storage requirements), computational load, and image quality. The exemplary compression options described below may be used, though it will be understood that any other compression scheme may also be used.

Motion JPEG is an intra-frame compression method, meaning it compresses each frame individually without reference to other frames in the sequence. This makes it computationally simple but may limit the compression ratio. JPEG is based on the discrete cosine transform (DCT). For grayscale images, JPEG achieves a compression ratio of roughly 5:1 at the threshold of visible loss.

Motion JPEG2000 is similar to JPEG, but is uses wavelet-based encoding instead of DCTs, provides better compression, but demands more processing. JPEG2000 can be about twice as efficient as JPEG compression. Assuming 10:1 compression using JPEG2000, gigapixel video at 5 fps would compress to about 1.8 TB/hr. Both Motion JPEG and Motion JPEG2000 are relatively low-latency and computationally un-intensive compared to other video codecs, but compress less.

MPEG-2 exploits the temporal similarity between subsequent frames in a video stream to achieve higher compression ratios than infra-frame methods like JPEG. Because it estimates motion between frames, it can be computationally more demanding than JPEG algorithms. For example, broadcast quality HDTV requires 20 Mb/s for color, 30 fps video. At 7 fps one may need only 5 Mb/s, and grayscale-only video reduces the rate to 4 Mb/s (color information is subsampled and more heavily compressed in mpeg video and represents only a small portion of the data). HDTV images are roughly 2 megapixel resolution, so a gigapixel image may require about 900 GB/hr ((100 MP/2 MP)*4 Mb/s=2 Gb/s=7200 Gb/hr). It may be important to note that MPEG-2 is only a decoder standard, and that encoding performance may vary for different encoder implementations.

MPEG-4 may also be used. In an embodiment, with a simple profile MPEG-4, a 20:1 compression ratio for 4 MP imagery on an air platform may be achieved; at 5 FPS, a gigapixel system can output about 9Tb/hr.

H.264 (MPEG 4, Part 10 AVC) may be more efficient than MPEG-2. In an embodiment, it can be two to three times as efficient as MPEG-2 compression. Thus, roughly 450 GB/hr of compressed data for a gigapixel video may result. However, H.264 may be even more computationally intensive than MPEG-2 and MPEG-4 Simple Profile. In general, at roughly double the computation, a 40-50% improvement in compression can be achieved.

An embodiment employs a MPEG-4 Simple Profile as an encoder. The Ateme TI DSP library may also be used. A single 1 Ghz DSP may be able to achieve 5 fps on 4 MP imagery. The resulting compression ratio may be about 20:1. The quality loss due to compression may not be noticeable to the human eye. A next generation chip from StreamProcessors, Inc, in Sunnyvale, Calif., may promise much faster compression, and may yield much data. Other exemplary compression chips are commercially available from Cradle Technologies in Mountain View, Calif.

Another way to improve performance may be to provide an initial search location to the MPEG algorithms using a motion estimation algorithm as described herein. When the search range is too short, the MPEG library may devolve into a JPEG library.

A drawback of MPEG encoding may be latency—images may be encoded in groups of pictures typically 15 frames long. For example, H.264 sequence is IBBPBBPBBPBBPBB, where the I-frame is intra-coded (similar to JPEG), the P frames are forward predicted from previous I or P frames, and B frames are bidirectionally predicted from preceding and following I or P frames. To decode a B frame, one must decode the I-frame of the group and as many P-frames as necessary to get to the reference images for the B-flame. This may slow down playback and make the system less flexible. Even a simple profile may suffer the same problems, although it only has P frames—IPPPPPPP . . . JPEG2000, by contrast, may not only allow independent access to each frame, but may also allow decoding at variable resolutions. In general, the encoding scheme may be selected based on available computation power and time for a given configuration.

In some applications, video and image compression may be optimized to exploit human perceptual deficiencies. However, to the extent that computer vision algorithms are applied to video, compression artifacts that would go unnoticed by human viewers may not be tolerable. One consideration therefore may be to determine how aggressively one can compress video without interfering with downstream tracking algorithms.

Tracking and Automated Inference: Tracking software may be used on the ground and/or in real time. For example, the VIVID library of source code, available on the web at http://www.vividevaluation.ri.cmu.edu/software.html, may be used as part of the tracking system. The tracking algorithm itself may use four stages: detection, tracking, geo-referencing, and inference.

Detection may include identifying features in a video stream that can be tracked. In an embodiment, a 3-frame differencing approach to detect moving objects may be used to avoid potential difficulties of mosaicking large images to collect longer term statistics on the background. From the resulting 0-1 mask, a nearest-neighbor search to make small blobs may be employed.

To track these hypotheses, a baseline mean-shift tracker with a fg/bg radio as described on the VIVID project page may be used.

Geo-referencing may be used so that an image produced by the present invention can be referenced to a ground point of some kind. Camera position data may help initialize this search, and a wide-area image can include multiple features that can be matched to features on a prior map. This method may be more accurate than previous "soda straw" approaches.

The system may need to determine when to alert a user to tracking information. Currently, it is imagined that various queries, such as "show any targets going through this area," "show any targets moving at the following speed," or "show where this target goes over the next few hours," may be used. Each of these may use a meta-language to describe the tracking results, for example to a search engine.

Computer vision algorithms that can provide consistent results across multiple scenery types may be used, such as by using confidence metrics so that operator expectations are set appropriately.

When multiple video streams to be mosaicked are not globally aligned (for example, when multiple camera in a camera array are perturbed by motion of the camera platform or already misaligned at the initial production stage), stitching them into one stream without any adjustment may cause mis-aligned layout of image mosaics. These problems may be reduced or removed by local (pairwise transformation) and global alignment of mosaics. Local and global alignments could be translation-only transforms, general homography transforms, or other transformations.

An embodiment comprises a method to combine multiple video streams into a single video stream, where the multiple streams include adjacent video of a large region. The system may have two stages: (1) pairwise transformation estimation and (2) global homogenization to ensure there are no contradictory estimates. The result may allow a system to take multiple video streams and place them into a single output stream, even with significant motion of the camera system platform.

An embodiment includes the following steps:

(1) Find a set of corner points on the overlapped regions, at the four edges of a single sensor video stream. The corner information (rather than whole image data) is used to alleviate intensive computation for mosaicking.

(2) Match a corner point in one video stream to another point in its neighboring video stream by correlation matching to obtain the pair-wise offset between those two adjacent video streams.

(3) Obtain a least squares solution that aggregates all the pair-wise motion offsets between neighboring video streams, acquired from step (2), to form a globally accurate estimate of the mosaics.

Other ways of varying and implementing this and other embodiments will be apparent to those of skill in the art.

Exemplary Implementation

In an exemplary system, existing COTS components may implement the various major modules of the camera. The strategy used to choose between different options for the implementation of a given function or component may weigh factors including: flexibility of implementation, processing and bandwidth requirements, availability of COTS components and suitability to the task. Exemplary hardware modules will now be discussed. It will be understood that other commercially-available hardware or custom hardware may also be used.

The Camera control Module may be a dynamic part of the system. In an embodiment the Camera control Module has lower critical processing demands than other elements of the system, to assure predictable and deterministic system performance. This module may be implemented using an embedded PC architecture. In a specific example, COTS interfaces can be used to provide a UAV Comlink and Cymbal control. Multiple parallel network channels may interface with the networks of the sensor modules and storage system.

Aside from the sensor itself, the remainder of the Sensor Module may be implemented using a combination of DSPs and FPGAs. DSPs are similar to microprocessors in that they run programs, but they are also optimized to do more operations in parallel. FPGAs are programmable logic parts, but instead of writing a program, the user specifies the gate level functionality of the FPGA. The flexibility of FPGAs allows for managing interfaces between different chips (often referred to as "glue logic"). In an exemplary system, FPGAs may generate control signals for the image sensors and receive the pixel data.

Partitioning more computationally intensive tasks between FPGAs and DSPs may involve tradeoffs between power, efficiency and code development time. FPGAs may be well suited for highly structured, highly parallel, computationally intensive algorithms. For example, filtering and downsampling, image warping, image cropping, brightness correction and contrast enhancement may all map well to FPGA architectures. As a specific example, JPEG2000 image compression may be implemented in real-time.

Although FPGA code can be written and simulated entirely in software, developing code for FPGAs can be a very time-consuming process. In contrast, Digital Signal Processors (DSPs) may be much simpler to program and in general are also designed for computationally intensive tasks. The DSPs may permit algorithms to be written and tested on PCs, and then retargeted to DSPs to meet high performance and small physical size constraints.

The following sections briefly describe various exemplary commercial processing options for the image capture and processing boards. In addition to FPGAs and DSPs, hardware video codecs are also described. Although it may be convenient to find high-volume (and therefore more inexpensive), high-definition video codecs, these may be convenient to find high-volume (and therefore more inexpensive), high-definition video codecs, these may be rare and expensive. Dedicated hardware may also reduce the flexibility of the system by embedding specific, static functionality, DSPs also may be used for these functions.

Exemplary FPGA chips include parts available from Xilinx and Altera. In one example, FPGAs include high-speed serial interfaces (e.g. RocketIO from Xilinx) that allow gigabit communication between devices. These may facilitate high-bandwidth communication between image capture and SPM processing boards. Third party IP cores are available for JPEG2000 processing from Barco and CAST.

Exemplary DSPs are available from TI and Analog Devices. In some configurations, the DSPs may include pre-configured software, such as MPEG and JPEG encoders. In one example, a TI TMS320DM642 is used for video processing. In another example, a TI TMS320C64xx series is used. DSP processors may also be available from other sources, such as Cradle Technologies and Steam Processors. General purpose processors (GPPs) also may be used where algorithms can be broken into multiple parallel paths to be executed in different on-chip processors. Other DSPs, such as those from Steam Processors, Inc. may provide a more parallelized architecture. Various codecs, such as H.264, HDTV (1920x 1080), or other codecs may be used.

Video Compression Codecs: VGA (720×480 pixel) MPEG-2 video compression is a standard for broadcast quality video. In an exemplary design, multiple compression processors are used to process images in parallel. For example, to compress a gigapixel video about 3000 such chips can be used. HDTV video codecs also may be used. The large image size and correspondingly larger motion search windows may make these codecs more robust to large image motions, though they may incur a higher computational cost. An exemplary HDTV encoder is the Hitachi High Technologies VASA encoder. A JPEG2000 encoding system also may be used. For example, a pair of ADV202 JPEG2000 encoders available from Analog Devices may compress HDTV video in real-time. Such a compression system may be implemented on a DSP or FPGA instead of using dedicated hardware. In an embodiment, a FPGA, DSP combination is used to provide a combination of performance and flexibility at reasonable cost.

Sample Storage Configurations: Physically small storage systems, such as 2.5" hard drives, may be used to take advantage of smaller space, weight and power requirements. As a specific example, in an embodiment 32 Western Digital Scorpio 80 GB WD800VE hard drives are used to store 2.5TB (one hour of 7 fps gigapixel video assuming 10:1 compression). Each drive may record at 22 MB/s. Other types and combinations of storage may be used. For example, an embodiment using twice as many drives may reduce the bandwidth by one half. When a mobile, airborne camera platform is used, hard drives may be selected for high altitude and low pressure situations. For instance, some hard drives may continue to be operable while flying above 10,000 feet.

Additional storage configurations may be used, such as RAID, with or without a unified interface to the array (such as FPDP), ruggedized storage, and modular storage. For example, VMetro hard drive systems may be used. Other storage systems may also be used; in general a storage system may be designed to match the platform with which it is to be used.

Figure 3:
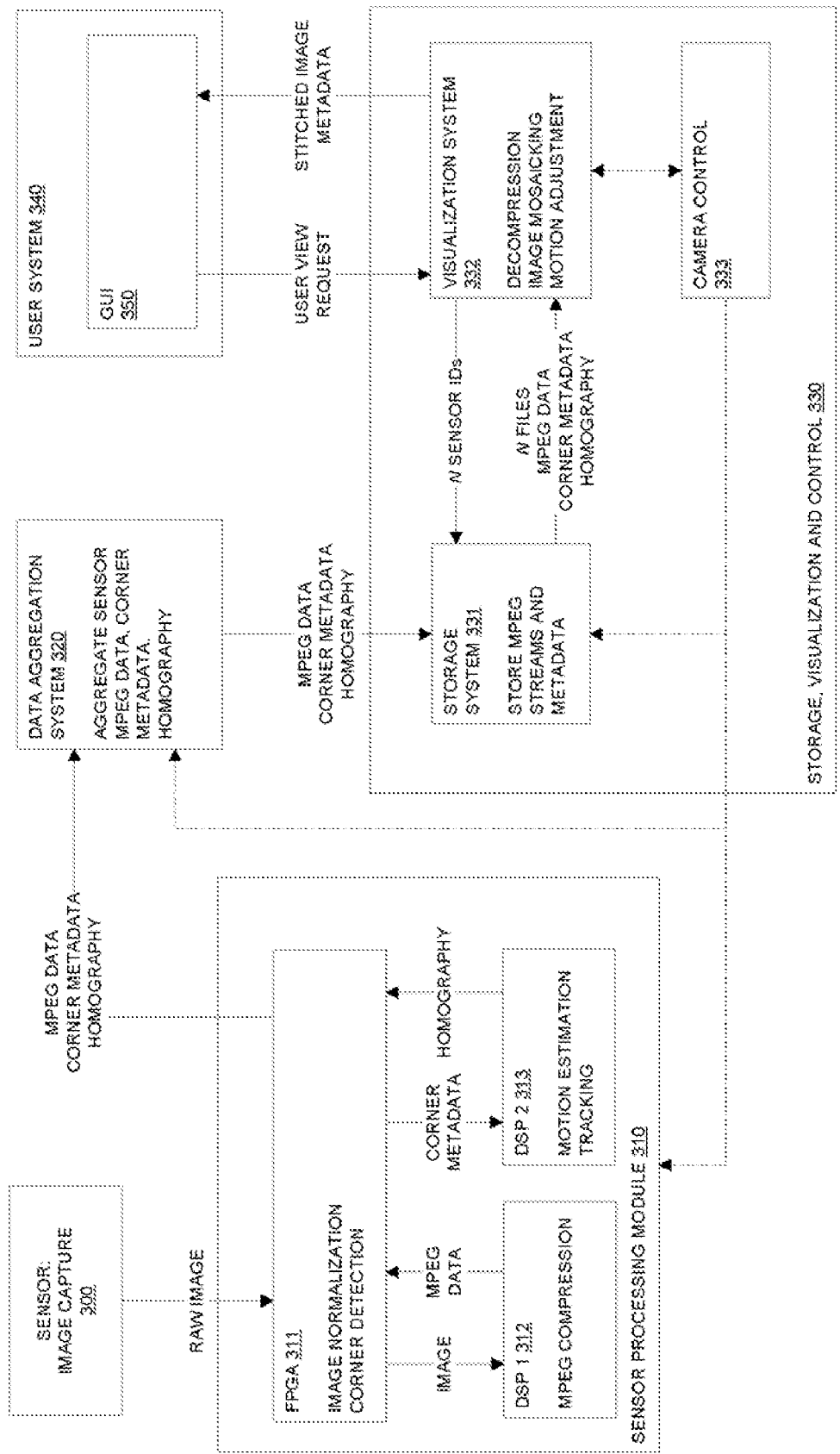
FIG. 3 shows a functional block diagram for providing data from image sensors to a user system according to an embodiment of the invention.

FIG. 3 shows a functional block diagram for an exemplary system for providing data from image sensors to a user system. Data paths are shown with solid arrows; control paths are shown with dashed arrows.

One or more sensors 300 capture initial image data. In an embodiment, a plurality of sensors is used to capture a gigapixel image. Sensor processing modules 310 can receive and process the raw image data. As previously described, there may be a sensor processing module 310 assigned to each sensor 300. The sensor processing module can include multiple processing chips, such as FPGAs 311 and DSPs 312, 313. For example, an FPGA 311 may perform image normalization and corner detection before sending image data and/or corner metadata to other processors 312, 313, respectively. The other processors may then perform compression, such as MPEG compression (312), motion estimation, and/or tracking (313). Compressed data and image homography can then be returned to the initial processor 311, and transmitted to a data aggregation system 320. The data aggregation system 320 may prepare the image data for storage, such as by serializing and/or multiplexing the data received from multiple sensors. Further details regarding operation of the aggregation system are described below. The prepared image data may then be sent to a storage system 331 for storage.

A module 330 may perform storage, visualization and control function. The module 330 may be integrated with the sensor processing modules 310 and sensors 300, or it may be physically separate. A wireless connection may be used for communication between the modules. A storage module 331 may store image data received from the data aggregation system 320. When a request for data is received from the visualization system 332, the storage module 331 may send image data, corner metadata, homography, and other relevant data to the visualization system. In an embodiment, the visualization system can specify the sensors for which image data is requested, such as when a user requests a view of a specific region observed by the sensors. It may also send control information to a camera control system 333 and/or the sensor processing modules 310. The visualization system 332 also may perform various operations to prepare the image data for presentation to a user, such as decompression, mosaicking, and motion adjustment.

In an embodiment, the visualization system prepares image data in response to a request from a user system 340, which may include a graphical user interface 350. Further details regarding the user interface are provided below. When a request is received from the user system 340, the visualization system 332 may coordinate image data capture and transfer between the sensor processing modules 310, the data aggregation system 320, and/or the storage system 331 as previously described.

Figure 4:
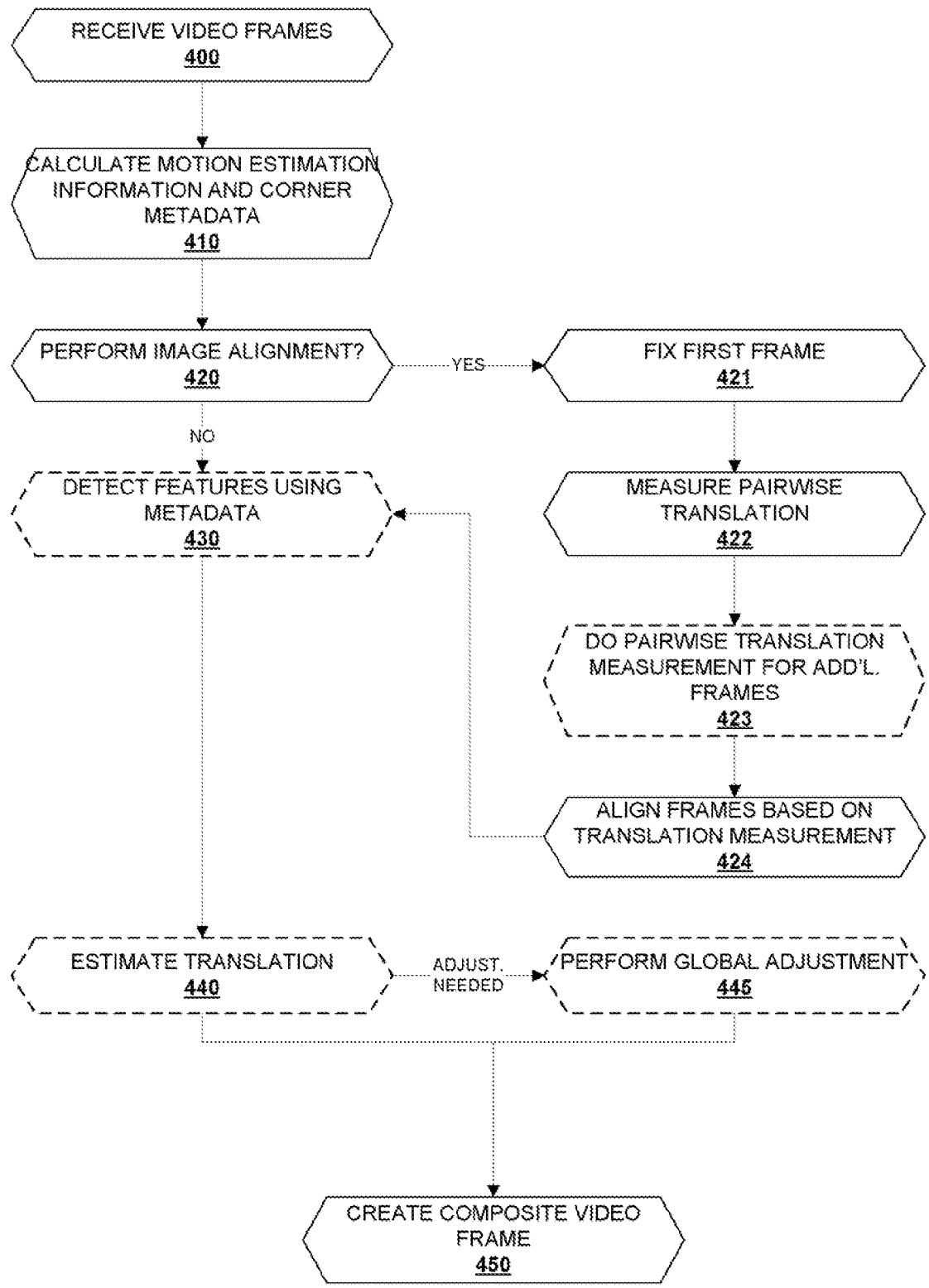
FIG. 4 shows an exemplary method for combining video streams according to an embodiment of the invention.

FIG. 4 shows an exemplary method for combining video streams. First, multiple sequences of video frames may be received from a plurality of sensors 400. At a pre-processing step 410, motion estimation information, corner metadata, and/or other metadata may be calculated as previously described. In some cases, the image data and associated homography information and corner metadata may then be stored for later use. In an embodiment, additional processing may be performed, such as image alignment 420. To perform image alignment, a pairwise translation method as previously described may be employed. After fixing the first frame 421, the pairwise translation can be measured relative to each neighboring frame 422. The frames may be aligned 424 based on the pairwise translation measurements relative to one frame, or additional frames may be used for pairwise translation measurements 423 and an average of the results used to align the frames. Additional processing steps, such as detecting corners and/or other features based on the corner metadata 430, estimating translation or other movement 440, and performing a global adjustment 445 may be performed as previously described. Based on the processing steps performed on the image tiles, a composite video frame may be created 450. For a video stream, some methods may be performed only on a subset of frames to speed processing time.

Aggregating Video Streams

Figure 5:
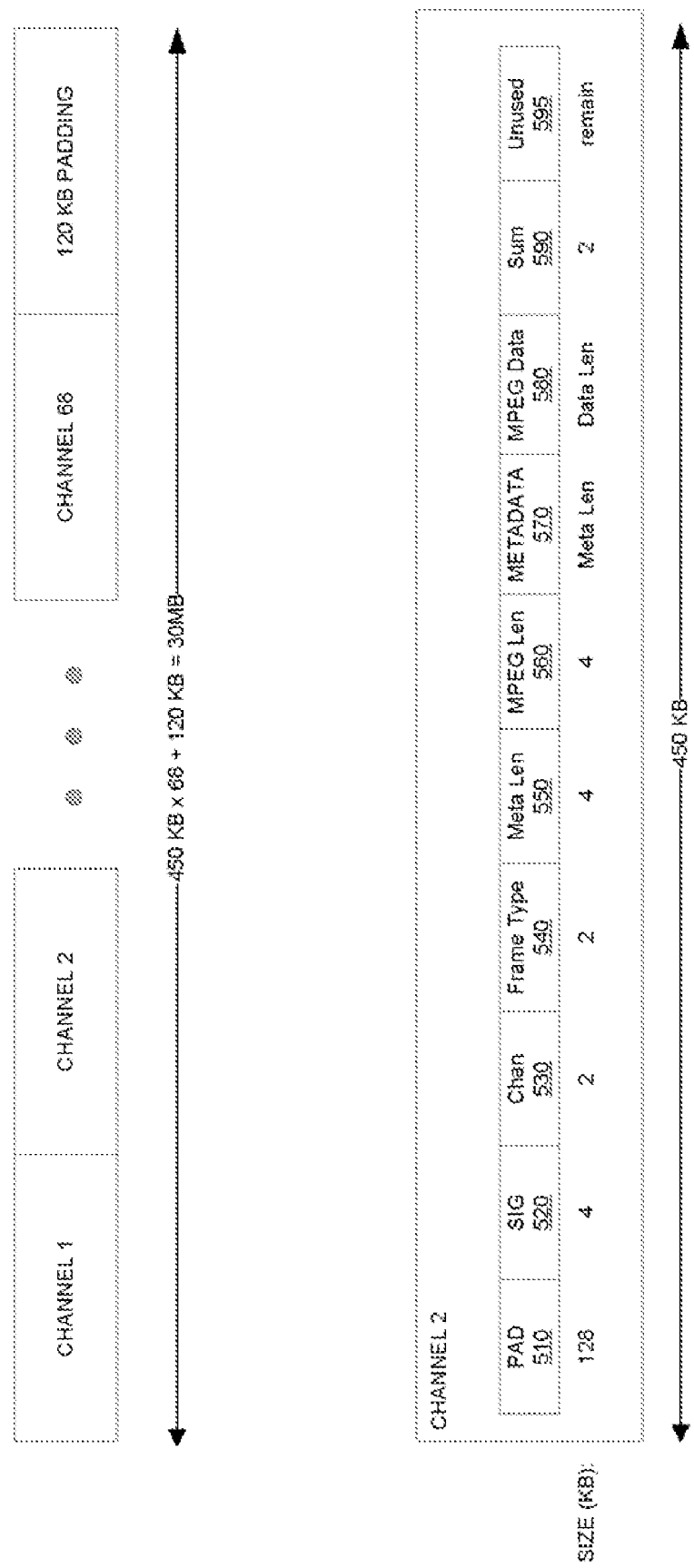
FIG. 5 shows an exemplary fixed-size data arrangement according to an embodiment of the invention.

Various data arrangements may be used by an aggregation system to serialize and/or multiplex image data received from the sensor modules. Exemplary methods include fixed-size record arrangement and variable-size record arrangement. In a fixed-size record arrangement, each recording block may be a multiple of a physically-relevant size. For example, a disk stripe in a disk group of 6 may have a size of (6 disks*512 KB)=3 MB, and therefore each recording block is placed into a block 3 MB in size. In general, any size block may be used, although writing blocks of a finer granularity, such as 1 kilobyte, may result in performance degradation in favor of storage efficiency. FIG. 5 shows an exemplary fixed-size data arrangement (similar to TDMA storage). In the example, each sensor image channel (out of 68) is given a slot of 450 Kb for data storage in 200 milliseconds. During this time 30 Mbytes of data will be written to disk for all 68 sensor image channels with additional padding. A fixed-size record arrangement may provide fast data retrieval, since accessing any arbitrary data stream at any time only requires calculating the offset and load the offset block.

In the fixed-size record arrangement, data are transmitted in order as byte0, byte1 and so on, and multi-byte values may have big-endian format. Specifically, byte 0 may be the most significant byte. Data fields in the packet may be defined as follows, though variations may be used. The 128-byte Pad 510 may be set to zeros by the aggregation system. The pad may provide drifting tolerance if data are missing from or duplicated in the transmission. A 4-byte "SIG" (4 bytes) 520 may indicate a packet is valid. For example, the SIG may be set to a secret key or the name of a provider of a processing system according to the invention. The 2-byte "Chan" entry 530 can store a channel number, identified by byte0*16+ byte0 in an embodiment. Similarly, the 2-byte Frame type field 540 may store a value=byte 0*16+byte1, where exemplary frame values are 0=normal, 1=Start frame, 2=Stop frame, and 0xFFFF=Invalid frame. The length of various data sent in each packet can be stored. For example, the Meta Len 550 can provide the length of any transmitted metadata; MPEG Len 560 can store the length of the encoded data; and (M&D) Sum 590 may store a summation of data from Chan (channel number) to Data. The packet payload can include Metadata payload 570 and MPEG Data payload 580.

Any unneeded portion of a packet may be left unused (595). The data throughput for the exemplary data stream shown in FIG. 5 for a 5 fps video stream is 150 Mb/s (30 MB/frame*5 frames/s). In an exemplary system 190 MB/s bandwidth per FPDP link may be sufficient to support 68 image streams (150 MB/s), but may not sufficient to support 136 image streams.

Figure 6:
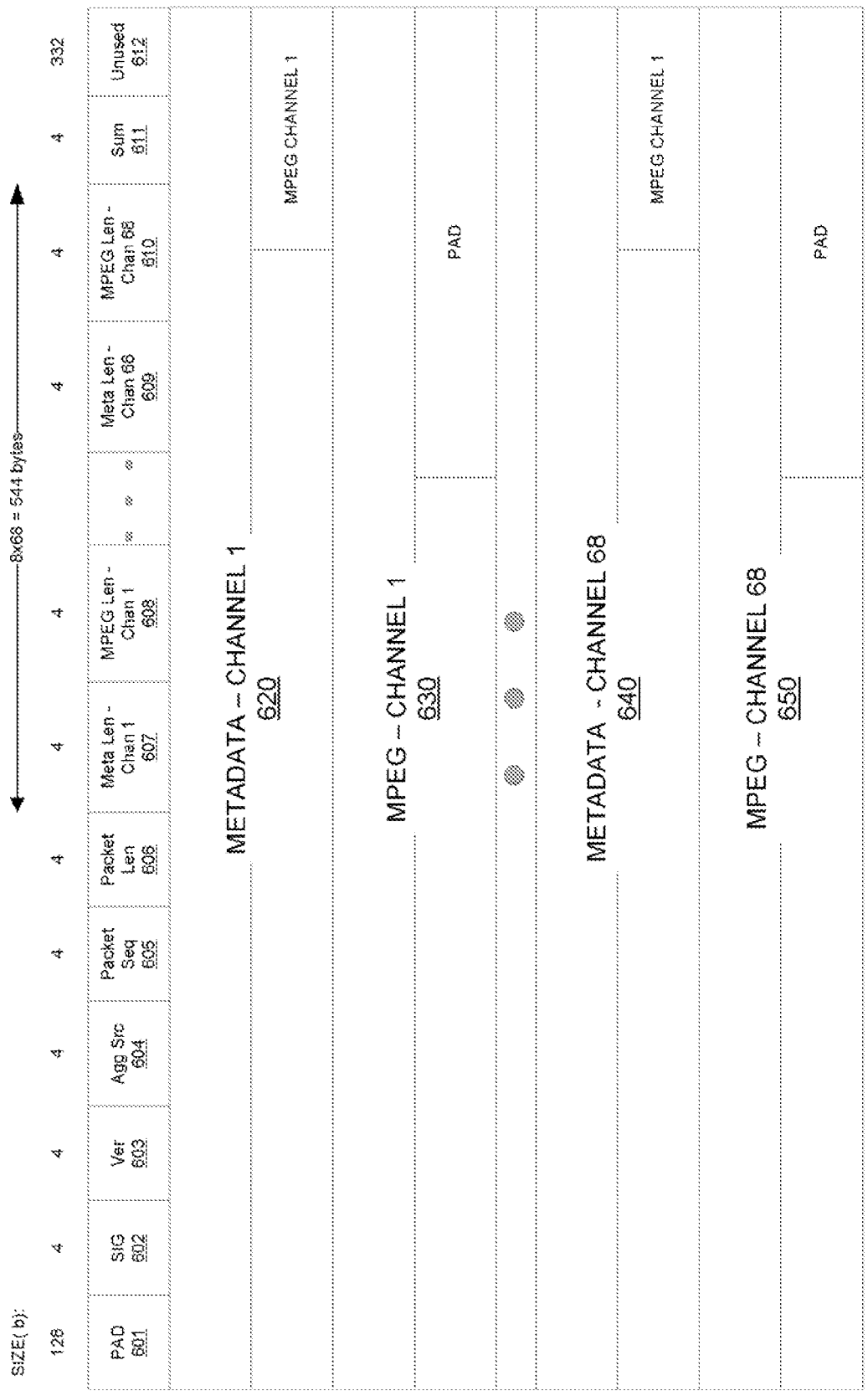
FIG. 6 shows an exemplary variable-size record data arrangement according to an embodiment of the invention.

An exemplary variable-sized record arrangement is shown in FIG. 6. In the illustrated example, data from different image sensors may utilize different record sizes, but they may all be 1-Kbyte aligned. In this type of arrangement, the frame written to storage by the aggregation system may have a variable size. The data fields are similar to the fixed size record, through other fields and structures may be used. A Pad 601 may be set to zeros by the aggregation system, and can provide drifting tolerance if data are missing or duplicated from the transmission. A SIG 602 may indicate a packet is valid. For example, the SIG may be set to a secret key or the name of a provider of a processing system according to the invention. The "Ver" field 603 can specify data version, such as when the structure of record arrangements has been changed in an embodiment. "Agg Src" 604 specifies the aggregation source; this field may be set by a timing and interface module to identify one of the multiple aggregation sources. The Packet Sequence ID 605 generally will be a regularly-incremented identifier which starts from zero on first recording, though other identification schemes may be used. The Packet Length 606 indicates umber of bytes the current packet occupies. For example, in a typical state, a single packet will be 1024 bytes. Channel lengths may be included in the packet, such as the meta data of a specific channel 607, 609, and the length of encoded data of a specific channel 608, 610. The packet payload can include Metadata payload 620, 640 and encoded data payload 630, 650. The stream ID may be embedded in the payload. A sum 611 of the data within channels 1 through N for N channels may also be sent in a packet. Remaining space 612 in the packet may be left empty, zero-filled, or otherwise unused.

A data arrangement such as illustrated in FIG. 6 may utilize the disk space more efficiently than a fixed-size record approach. It also may accommodate situations where there are fewer image streams in the file, by setting appropriate fields to zero. This arrangement also may allow for the use of multiple MDR units in the optical imaging system. To retrieve a data stream at a given time, a search may start from the beginning of the file. Then, each header may be read to determine where the next record is located, until the desired record number has been located. For example, to locate second 299 in a 300 second recording, a total of (299*5)=1495 reads may be performed to locate the desired frame. Since in an embodiment data may be read back over a high-speed interface, read-back speed may be sufficiently high that several hundred to several thousand reads to locate a frame may not result in unreasonable delay. Other ways of varying and implementing these and other embodiments will be apparent to those of ordinary skill in the art.

Figure 7:
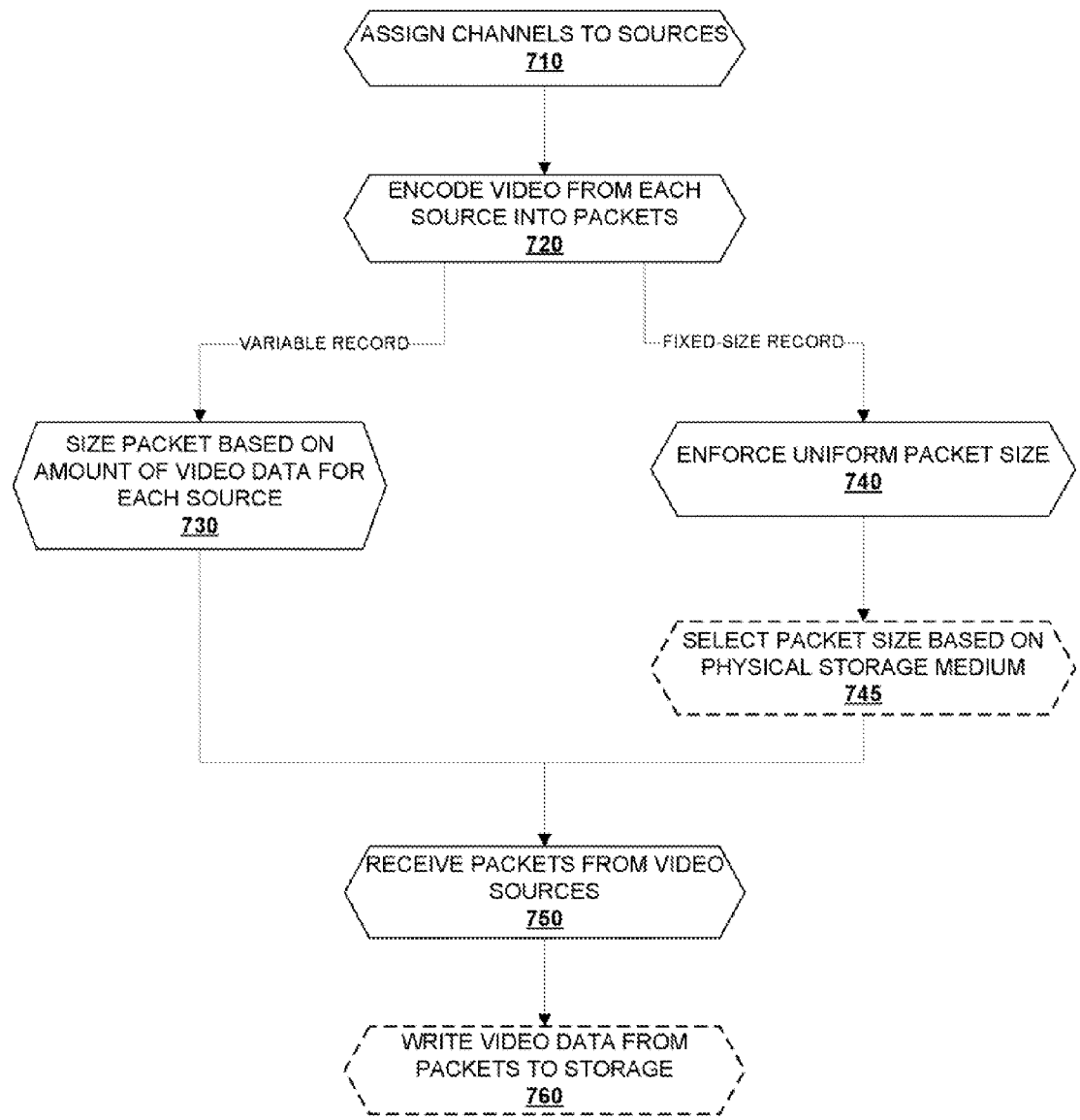
FIG. 7 shows an exemplary method for aggregating video streams according to an embodiment of the invention.

FIG. 7 shows an exemplary method for aggregating video streams. An aggregation system may assign channels to various video stream sources 710, or the channels may be pre-assigned to various sources. In an embodiment, each channel is assigned to a sensor in a multi-sensor array such as a CCD or CMOS camera array. Each source can provide a series of images, such as a video stream, which are encoded into packets 720. If a variable record scheme is used, the size of each packet may be determined from the amount of video received from each source for each packet 730. If a fixed-size record scheme is used, each packet may be the same size 740. In an embodiment, the packet size may be based on a related physical dimension 745, such as a convenient block size for a specific physical storage medium. Other fixed sizes may be used, such as a size determined by the transmission medium over which the packets will be transmitted to the aggregation system. The aggregation system can receive the packets from the multiple video sources 750 and write the video data encoded by each packet to a storage medium 760. The video data may be recorded in the order or format in which it is received, or it may be constructed into a format suitable for later use. In an embodiment, the aggregation system may construct a large-scale video stream from the individual streams using methods described herein.

User Interface

In an embodiment, a graphical user interface (GUI) is provided to allow a user to request, view, and manipulate image data. The user interface may be displayed by a general-purpose computer on one or multiple displays. It may communicate with various other systems, such as image capture and storage systems, by sending requests for image data requested by a user. Various overlays, icons, and other information may be presented in conjunction with image data received from the other systems.

In an embodiment, the GUI may be displayed and manipulated at a location remote from the optical sensors that capture image data. For example, where an airborne observation system is used, the GUI may be ground-based, allowing the user to remain at a fixed location on the ground while image data is captured. In an embodiment, the GUI may allow an operator to search through captured video quickly determine what happed during a time that a selected region was observed. The GUI also may provide a live data downlink, i.e., real time image data. It may handle border interception information as well as multiple live data downlinks.

The GUI may allow a user to interact with multiple cameras, provide searching tasks for other human operators, coordinate with a map, and provides integration with automated tracking and other alert information. For example, an embodiment may monitor a large area using a single camera or a set of cameras by allowing transitions between a set of cameras or tiled cameras. An exemplary GUI may recommend the possible next video camera to search and then cue the relevant video at the relevant time for the operator to switch viewing from one camera to the next. When the views are adjacent, the effect may be as if the user was digitally panning, tilting or zooming. If the camera are not adjacent, the effect may be a 3-D rotation or merely a fade and dissolve to the next camera or some other effect.

In an embodiment tasks are created for separate people to search in a large video dataset for separate incidents and interesting targets. This embodiment may allow users to coordinate with other agencies to share the information (such as location and appearance data) so as to catch or engage targets. This embodiment may also use automated tracking information to cue the video to interesting activity, with the intention that the user spawns off a task to follow up on the alert.

A GUI may provide a plurality of views to a user. For example, one or more views may include an image providing a wide-angle view; while one or more other views may comprise an image providing a narrower-angle view from within the same image (e.g., within the wide-angle view). Viewing parameters (e.g., pan, tilt, zoom, etc.) of this narrower-angle view may be subject to real-time user control via the GUI. Thus, a set of views may comprise a wide-angle view and a virtual PTZ view.

The user interface may include a component to display image data and other information to the user and a component that creates a display and requests data from an image processing system as previously described and creates the image to display to the user. The interface may use a dual display configuration. For example, there may be an overview map providing higher-level views and access to the entire area captured by optical sensors, and an area to display task views as defined by a user. Exemplary tasks are to watch a certain area at a certain zoom, and to track a particular object anywhere in the field of view of the camera. Other tasks may be defined. The user interface can translate the tasks defined by the user into control data that is sent to an imaging system and/or requests for image data that are sent to an image storage or processing system. Controls maybe context sensitive. Transparency may be used when appropriate to allow for additional data to be shown without cluttering the display.

The GUI may provide mechanisms to search through stored video, such as through pre-defined task views. For example, to begin searching backward in time through a video data, the user may set up a task to follow a truck displayed in a video stream. The GUI can allow a user to pan, tilt, and zoom within the video stream to obtain additional information about a tracked object.

Another exemplary usage may be that of tactical viewing of any portion of a complete gigapixel image or video stream. As a specific example, small UAVs are used for tactical reconnaissance. These UAVs may provide live video feeds of terrain ranging from a few hundred feet away to a few miles away. However, the availability of these UAVs may be liquid. A gigapixel system can be used to provide similar tactical reconnaissance. The initial focus may be to provide overview images of the complete camera field and provide a limited number of live feeds at full resolution, but only covering a very small portion of the camera's field of view. These live images could be fed from a ground station to units in the field using wireless links. The live images for the unit can be only a very small portion of the total camera view. A potential advantage of such a configuration is that the camera can provide multiple, non-adjacent views at the same time. Additionally, the views can be reassigned to different units as user requests and priorities change.

Displaying a gigapixel image may require capabilities not available in all standard displays. If one wanted to use multiple standard displays to create a gigapixel panel, the panel of displays may consist of roughly 500 displays. Something this large may not only be expensive and physically difficult to assemble, but also may not be useful to an individual user. To display a gigapixel image on a single monitor, tow techniques may be utilized: subsampling of the raw data and iconic identification of data of interest.

A full gigapixel image may be subsampled and displayed on a single monitor. This may serve two purposes—reducing the data displayed to the user and reducing the amount of data transferred from a camera. The subsampled data can be requested directly from the camera to reduce the total bandwidth through the system. A desired resolution can be provided to a camera and subsampling performed as the image is captured. By combining the subsampled image data with cameras capable of tracking identified targets, the cameras can send meta-data, rather than raw image data, identifying target locations. The GUI can then generate Iconic images to identify the location of the targets on the display. Additionally, the user can request zoomed, higher resolution images from the camera. In an embodiment, the amount of image data retrieved from the sensor system generally can be less than the resolution of the display device.

A geographic information system (GIS) may be utilized with the system to allow each type of data to be dynamically layered on or removed from the display, as requested by a user. By using a GIS, additional data from other sources can also be added.

Icons may identify targets in a displayed image. However, as multiple targets fill a confined area, the iconic display may become crowded and lose effectiveness. Therefore, the display may transition from showing individual icons to shading the displayed image based on activity density. As the level of activity increases, the icons may disappear and be replaced by colored shading. The color of the shading can reflect the level of activity, importance and/or other details about the objects being monitored.

To present fine-grained views of the data, a user may be able to interactively define a region and zoom level. For example, a GUI may use multiple display modes such as a zoomed window over the main map, a zoomed task view on a second display, or other display modes.

The GUI can include tools built in to create tasks, to define what the task is, define the rules for the task, add notes, assign the task, and perform other operations to create, modify, and manage tasks. The history of the task may be maintained and recorded in chronological order. For example, as an operator searches through the actions of a tracked object, the system may record the operator's actions, allowing the "searching" task to be replayed or exported as a normal video. The GUI also can provide additional reporting and configuration capabilities.

When target-based tracking is used, the GUI can record an area image data around the target at full resolution in addition to recording the target location in meta-data. This can reduce bandwidth needed for communication between the GUI and other elements of the system, since a camera can record full resolution data only if there a user has indicated something of interest in the region being observed. A recorded view can be pulled down from the camera on demand, or retrieved once the full sensor unit has returned to the ground.

Figure 8:
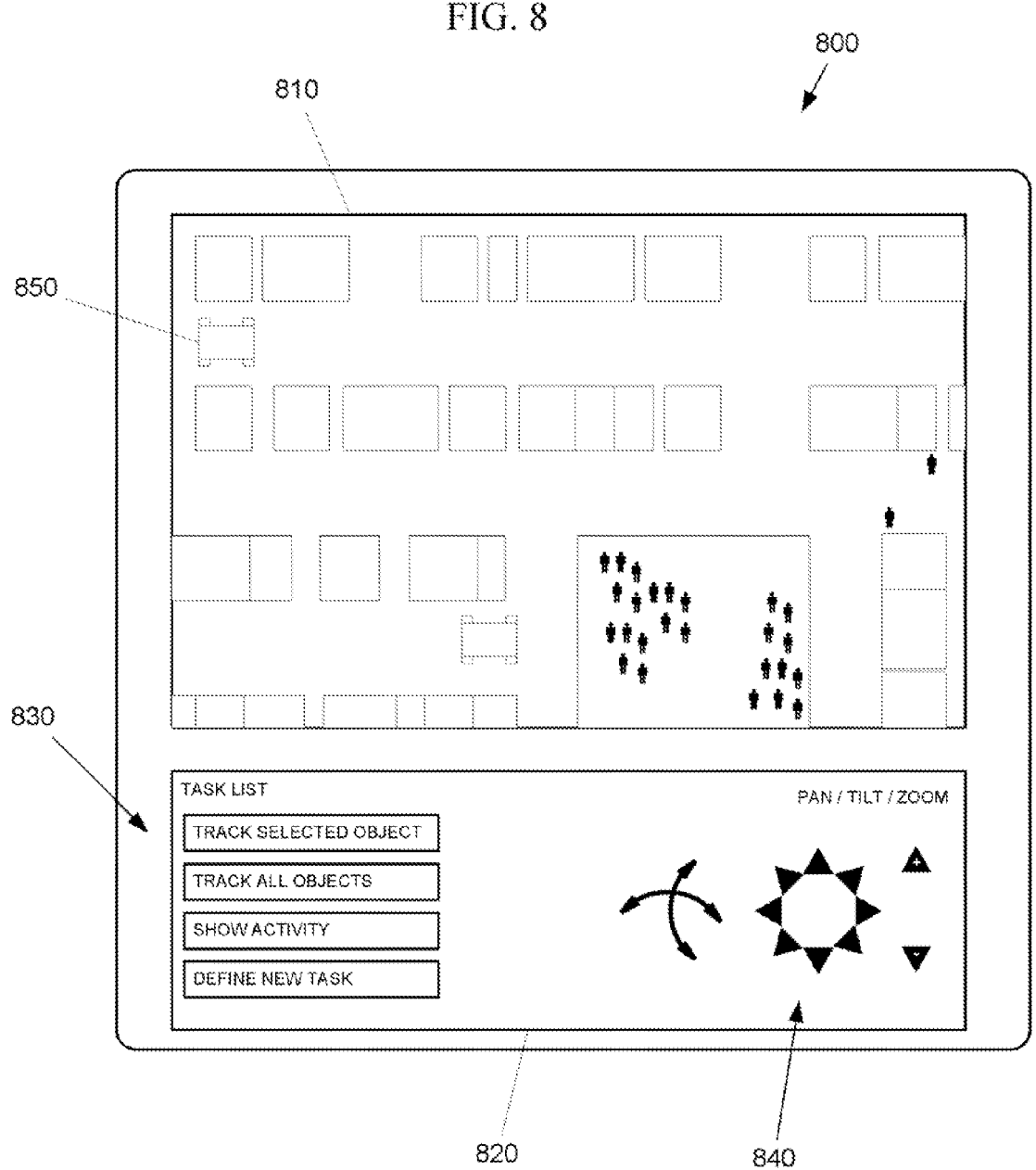
FIG. 8 shows an exemplary user interface according to an embodiment of the present invention.
Figure 9:
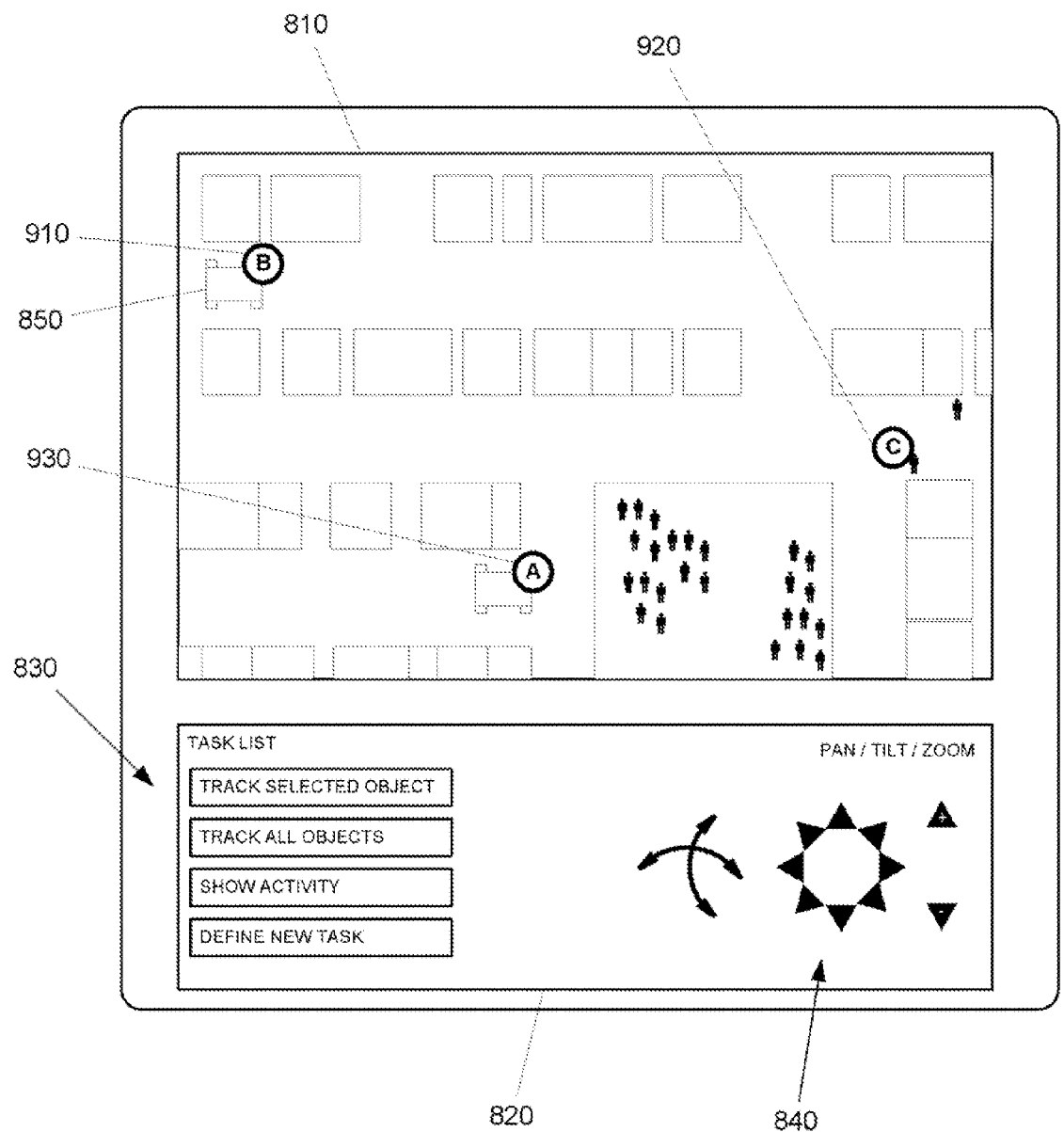
FIG. 9 shows an exemplary user interface according to an embodiment of the present invention.
Figure 10:
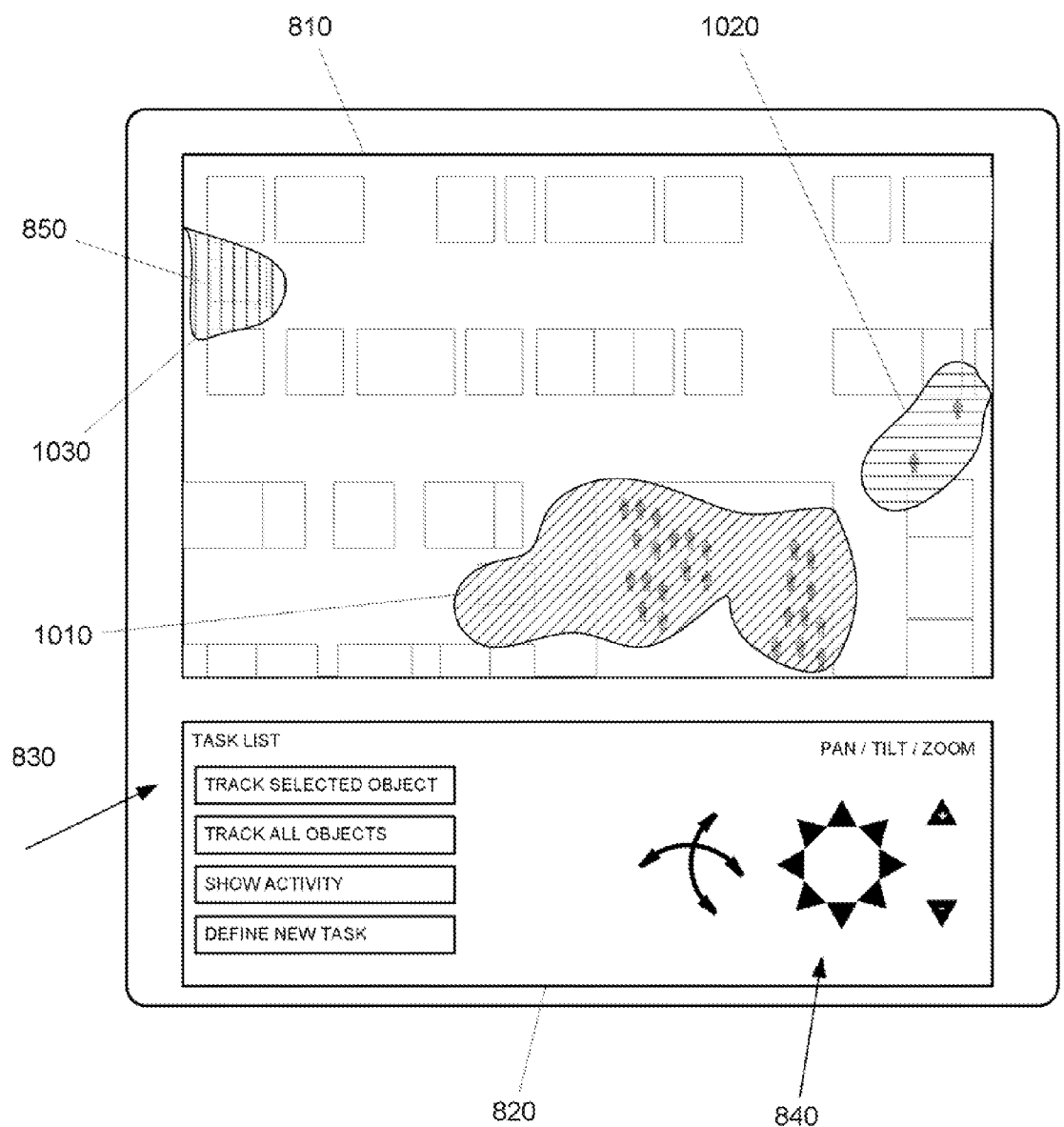
FIG. 10 shows an exemplary user interface according to an embodiment of the present invention.

FIGS. 8-10 show an exemplary user interface according to an embodiment of the present invention. Referring to FIG. 8, a user interface 800 is shown which includes an image display component 810 and a control component 820. The image display component 810 may display image data received from a visualization system and/or optical sensors as previously described. The control component 820 may provide an operator various ways to modify an image displayed in the display component 810, such as pan/tilt/zoom functions 840 and tasks 830 as previously described. In an embodiment, the display component can display portions of or an entire gigapixel image. The control component 820 and display component 810 may be displayed on separate hardware displays, such as multiple monitors connected to a general purpose computer.

An exemplary portion of a gigapixel image of an urban scene is shown. It will be understood that any image may be used. The image may contain various features 850 of interest to an operator, such as vehicles, people, and other objects. As previously described, an embodiment may provide options for an operator to track one or more features, view general trends in the displayed image and/or video, and perform other operations.

FIG. 9 shows the same user interface as in FIG. 8, where an operator has selected several features for tracking. For example, the operator may have initiated a "track selected object" task with respect to three objects. In response to such a request, the display component 810 may display an overlay on the image. For example, various icons 910, 920, 930 may be displayed near or on the objects selected by the operator. When a video stream is displayed by the display component 810, the icons may move to track movement of the selected objects. For example, as a vehicle 850 progresses down a street, the assigned icon 910 may also appear to progress down the street in the region of the vehicle. Other functions may be used, such as viewing the video backward in time to determine previous events of a feature.

FIG. 10 shows the same interface as in FIG. 8, where an operator has requested an overlay showing activity within the displayed image. For example, the operator may have initiated a "show activity" request. The overlay may include various regions displayed over the image 1010, 1020, 1030, each of which may have a different color, shading, transparency, or other characteristic to show different levels of activity within the displayed image data. For example, lighter colors may show less activity, and darker colors more activity. "Activity" may be defined by an operator. For example, an area having many moving objects, such as a crowd, may be assigned a high activity level, and an area having few moving objects, such as a single vehicle, may be assigned a low activity level. As another example, activity may be determined based on the degree of movement in an area. In such a scheme, a single quickly-moving vehicle would be assigned a higher activity than a crowd of people within which there is little movement. Other definitions and overlay schemes may be used.

Figure 11:
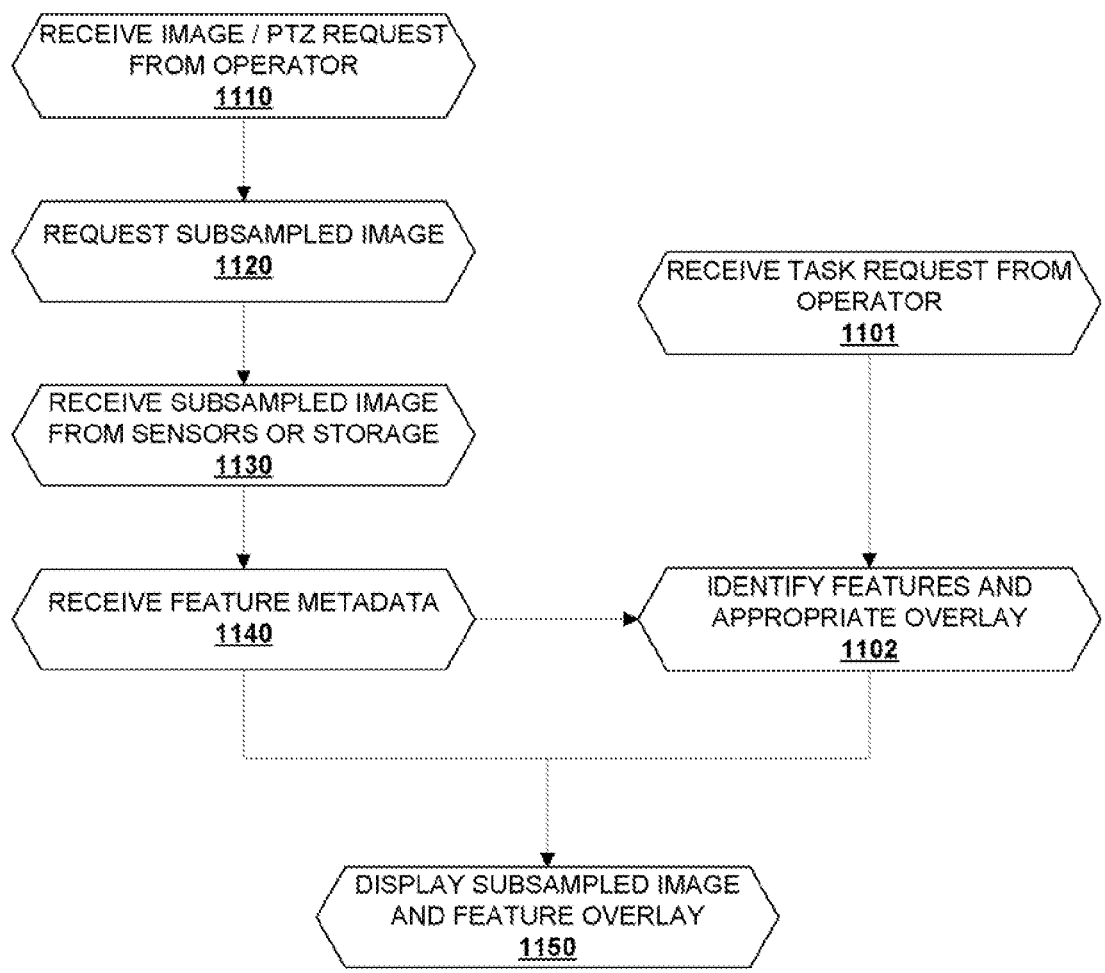
FIG. 11 shows an exemplary method for displaying image data according to an embodiment of the invention.

FIG. 11 shows an exemplary method for displaying image data according to an embodiment of the invention. When an operator requests an image or video stream 1110, the user system or interface may request a subsampled image, such as from a storage and/or aggregation system 1120. The user request may also be a pan-tilt-zoom (PTZ) request of a specific area imaged by the optical sensors. In general, subsampling will be used when the user requests a portion of a composite image or video stream stored in the system, though it may be used when the user requests the entire image or video to reduce processing and transmission time. The subsampled image can be received directly from sensors, or it may be received from a storage system 1130. In an embodiment, the user interface can also receive feature metadata 1140, such as corner metadata, to be used in identifying and manipulating features in the image data. In an embodiment, the operator may also request a task 1101, such as displaying certain features; this task may be requested before, after, or at the same time as the request for the initial image data. Based on the image data and a task request, the user interface can identify features relevant to the task and construct an overly 1102. The image data and/or the overlay are then displayed to the user 1150.

Exemplary Usage Scenarios

Several sample usage cases are described below. While many of these sample usage cases suggest use of a camera system in an aerial vehicle, it will be appreciated that use need not be limited to such flying platforms. Indeed uses may include ground-position uses (e.g., on a ground vehicle), water-based uses (e.g., on a watercraft), and fixed-position uses. It will further be understood that the presented scenarios are intended to be non-limiting examples, and are provided to illustrate specific embodiments of the invention. Other variations, embodiments and configurations may be used, and embodiments of the present invention may be used for scenarios other than those described herein.

An embodiment may be used to perform a terrorist bombing retrace. Before an event such as a terrorist bombing, it is may be difficult to detect which actors are going to strike beforehand and prevent it proactively. However, after the fact, it is possible to trace backwards in time and figure out key facts about the bombing using an embodiment of the present invention. For instance, where did the truck bomb enter the city? Where did the truck stop along the way? What routes did the truck use to escape detection? All of these questions may help prevent future attacks and apprehend the suspected individuals. With the wide area coverage provided by a gigapixel camera according to an embodiment of the invention, the intelligence community could possibly analyze the events leading up to and subsequent to a bombing.

Large blind spots in conventional ground sensors may limit continuity and prevent easy traceback in time. In addition, appropriate software to visualize, time-correlate, and coordinate multiple sensors may not be readily available or easy to use. Last, these sensors may be easy to detect, and local forces could create distractions and other countermeasures for a planned attach. In addition, conventional aerial sensors may not provide both wide area persistent coverage and high resolution.

In an embodiment of the present invention providing sufficient storage to store video of an area for which a retrace is desired, an airplane could be instructed to land after the explosion, and the data could be analyzed on the ground. Thus, the system need not necessarily have on-board real time tracking. In an embodiment, some real time tracking also may be used to tag the data for easy search at a later date. Since much of the analysis could happen on the ground, the need for a data link may also be minimal.

In an embodiment a tactical "eye in the sky" can allow a tactical commanders to look over a hill or around a building to see what enemy lurks ahead. Traditionally, human scouts have been used for such purposes. However, scouting may risk detection, which may be dangerous for both the scout and the main unit. Currently, many units may employ tactical UAVs. Such a vehicle can have about a 4 ft wingspan, causing difficulty in transporting the vehicle and risking detection and potential attack of the unit and/or destruction of the UAV.

An embodiment of the present invention can provide multiple units the ability to "peer over the hill". It may "chip out" an area of interest within the larger image and transmit only that area of interest to the field commander. The platform also can service multiple units in a particular area of engagement. An embodiment may therefore serve as a replacement for numerous, small, low resolution UAV cameras that currently provide tactical support by delivering similar images without the need for local deployment. In an embodiment, a scaled-down version of the present invention also may be used to provide for mobility. In an embodiment, automated tracking may be used to identify areas for observation.

A third exemplary usage case involves a border patrol. With no fences across much of the US border, it may be easy for smugglers and illegal immigrants to cross into the US. Current technologies may not meet this need. Seismic, microwave, and laser sensors may be costly to install and may not provide the extra information to discern a human from a wild animal. Cameras may be expensive to mount along an entire border, and thus, video coverage may be sparse. In an embodiment, an observation system as previously described can provide wide-area aerial coverage of a border. For example, a UAV may fly overhead and detect border crossers. With automated visual detection and tracking, the camera system itself could pick out any moving object and alert a user for further interrogation.

Another exemplary usage case is for a sensor to provide live data to other forces in the air. A key capability of a military customer may be the "sensor-to-shoot capability." As a specific example, The US Air Force may use a "find/fix/track/target/engage/assess" system when engaging enemies. An embodiment of the present invention can speed up each of these steps. With an intelligent optical sensor, the find, fix and track portions of such a system can be performed automatically. High resolution imagery may provide persistent coverage of a wide area, and such a high resolution sensor may increase the likelihood of fording targets to attack. For example, a UAV may spot targets on the ground, geo-locate them, and provide tracking data for engagement by other aerial vehicles (or the same vehicle).

There are numerous other commercial usage cases of such technology, including the ability to monitor traffic in cities, to search for crime evidence forensically in a city, and to provide real time position data on critical assets in a city. Additional usages of the methods and systems described herein will be apparent to those of ordinary skill in the art.

The various computer systems described wherein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g. random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. An apparatus comprising:
    a plurality of optical sensors each outputting a video frame corresponding to that sensor;
    a plurality of sensor processing modules, each sensor processing module to calculate metadata for a video frame received from at least one of the plurality of optical sensors; and
    an aggregation system to serialize video data representing the output of said optical sensors and metadata received from the plurality of sensor processing modules to form a composite image.

2. The apparatus of claim 1, wherein the metadata comprises a motion estimation calculated from the video frame and at least one previous video frame received from the same at least one of the plurality of sensors.

3. The apparatus of claim 1, wherein the metadata comprises a description of at least one feature detected in the video frame.

4. The apparatus of claim 1, wherein the metadata comprises information describing at least one corner detected in the video frame.

5. The apparatus of claim 1, further comprising a storage system to store video data and metadata received from the aggregation system.

6. The apparatus of claim 1, wherein the composite image is a gigapixel image.

7. The apparatus of claim 1, wherein the optical sensors, sensor processing modules, and aggregation system are contained in an airborne observation platform.

8. The apparatus of claim 1, wherein each of the plurality of sensor modules captures a 4 megapixel image.

9. The apparatus of claim 1, wherein the aggregation system provides image data to the storage system in a fixed-size record arrangement.

10. The apparatus of claim 1, wherein the aggregation system provides image data to the storage system in a variable-size record arrangement.

11. The apparatus of claim 1, further comprising a signal generator to generate a frame synchronization signal.

12. A method of generating a video stream, comprising:
    receiving a plurality of video frames generated by a plurality of optical sensors;
    using a plurality of sensor processing modules, calculating metadata for each video frame received from at least one of the plurality of optical sensors; and
    serializing the video frames and metadata received from the plurality of sensor processing modules.

13. The method of claim 12, further comprising calculating a motion estimation for each of the plurality of video frames and at least one previous video frame received from the same at least one of the plurality of sensors.

14. The method of claim 12, wherein the video stream contains image data depicting a sub-window of the area captured by the plurality of optical sensors, the sub-window selected in response to a pan-tilt-zoom request.

15. A method of combining multiple video streams, comprising:
    receiving a plurality of video frames, each video frame corresponding to image data obtained concurrently by one of a plurality of optical sensors;
    calculating mosaic estimation metadata for each of the plurality of video frames; and
    creating a composite video frame from the plurality of video frames and mosaic estimation metadata.

16. The method of claim 15, wherein the mosaic estimation metadata is calculated for a sub-window of the area being imaged by the plurality of optical sensors, the sub-window corresponding to a pan-tilt-zoom request.

17. The method of claim 15, wherein the mosaic estimation metadata includes feature metadata calculated for at least two of the plurality of video frames, the at least two video frames captured by different optical sensors at about the same time.

18. The method of claim 15, wherein the mosaic estimation metadata includes motion estimation metadata calculated based on at least two of the plurality of video frames, the at least two video frames captured by the same optical sensor at different times.

19. The method of claim 15, further comprising:
    assigning a fixed position to a video frame selected from the plurality of video frames;
    measuring pairwise translation for each of the plurality of video frames neighboring the selected video frame; and
    aligning each of the neighboring video frames to the selected video frame based on the pairwise translation measured for that video frame.

20. The method of claim 19, further comprising:
    iterating the steps of assigning a fixed position to a selected frame and measuring pairwise translation for each of the neighboring frames; and
    calculating an average position for each of the plurality of video frames from the set of positions in which each video frame was fixed based on the measured pairwise translations.

21. The method of claim 15, wherein creating the composite video frame further comprises:
    estimating the translation of a feature displayed in each of the plurality of video frames; and
    performing a global adjustment on the plurality of video frames to correct for movement of one or more of the plurality of optical sensors based on the estimated translation of the feature.

22. The method of claim 15, wherein the plurality of video frames are captured by a mobile sensor platform.

23. The method of claim 15, wherein the composite video frame is a gigapixel image.

24. The method of claim 15, wherein each of the plurality of video frames is a 4 megapixel image.

25. The method of claim 15, wherein the optical sensors are provided by an airborne observation unit.

26. The method of claim 15, wherein the plurality of optical sensors are configured to concurrently obtain video frames by a frame synchronization signal.

27. A method of aggregating video streams, comprising:
assigning a channel to each of a plurality of video sources;
for each video source, encoding video data from the video source into a series of packets using an electronic apparatus;
encoding each packet with metadata describing the video data encoded in the packet using an electronic apparatus, the metadata containing image transformation information; and
receiving packets from the plurality of video sources, wherein each video source electronically transmits a packet to the channel assigned to the video source.

28. The method of claim 27, wherein the image transformation information includes motion estimation metadata.

29. The method of claim 27, wherein the image transformation information includes feature detection metadata.

30. The method of claim 27, wherein each packet is a size corresponding to the amount of video data encoded by each video source.

31. The method of claim 27, wherein each packet is a size corresponding to a physical storage location in an aggregation system.

32. The method of claim 31, wherein each packet is the same size.

33. The method of claim 32, wherein the packet size is equal to a disk stripe in a multi-disk array.

34. The method of claim 27, wherein one channel is assigned for each optical sensor in a multi-sensor array.

35. The method of claim 27, wherein the plurality of video sources obtain video data concurrently using a synchronization signal.

* * * * *